(12) United States Patent
Lachwani et al.

(10) Patent No.: US 9,015,832 B1
(45) Date of Patent: Apr. 21, 2015

(54) APPLICATION AUDITING THROUGH OBJECT LEVEL CODE INSPECTION

(71) Applicant: Google Inc., Mountain View, CA (US)

(72) Inventors: Manish Lachwani, Sunnyvale, CA (US); Jay Srinivasan, San Francisco, CA (US); Pratyus Patnaik, San Francisco, CA (US)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/655,667

(22) Filed: Oct. 19, 2012

(51) Int. Cl.
*G06F 21/00* (2013.01)
*G06F 21/52* (2013.01)
*G06F 21/56* (2013.01)

(52) U.S. Cl.
CPC ............... *G06F 21/52* (2013.01); *G06F 21/56* (2013.01)

(58) Field of Classification Search
CPC .................................. G06F 21/52; G06F 21/56
USPC ....................................................... 726/22, 26
See application file for complete search history.

(56) References Cited

U.S. PATENT DOCUMENTS

| | | | |
|---|---|---|---|
| 4,953,084 A | 8/1990 | Meloy et al. | |
| 6,131,188 A | 10/2000 | Goebel | |
| 6,145,122 A | 11/2000 | Miller et al. | |
| 6,151,701 A | 11/2000 | Humphreys et al. | |
| 6,598,221 B1 | 7/2003 | Pegatoquet et al. | |
| 6,829,733 B2 | 12/2004 | Richardson et al. | |
| 7,051,238 B2 | 5/2006 | Gardner et al. | |
| 7,418,697 B2 | 8/2008 | Gryko et al. | |
| 7,805,707 B2 | 9/2010 | Pouliot | |
| 7,870,540 B2 | 1/2011 | Zare et al. | |
| 7,991,747 B1 * | 8/2011 | Upadhyay et al. | 707/674 |
| 8,370,810 B2 | 2/2013 | Oda | |
| 8,375,450 B1 * | 2/2013 | Oliver et al. | 726/24 |
| 8,479,166 B2 | 7/2013 | Nir-Buchbinder et al. | |
| 8,504,987 B2 | 8/2013 | Li et al. | |
| 8,671,080 B1 * | 3/2014 | Upadhyay et al. | 707/674 |
| 2002/0010710 A1 | 1/2002 | Binnig | |
| 2002/0040470 A1 | 4/2002 | Guthrie et al. | |
| 2002/0166081 A1 | 11/2002 | Richardson et al. | |

(Continued)

OTHER PUBLICATIONS

Seo, Seung-Hyun et al., "Analysis on Maliciousness for Mobile Applications", 2012 Sixth International Conference on Innovative Mobile and Internet Services in Ubiquitous Computing, Jul. 4-6, 2012, pp. 126-129.*

(Continued)

*Primary Examiner* — Michael Pyzocha
(74) *Attorney, Agent, or Firm* — McDonnell Boehnen Hulbert & Berghoff LLP

(57) ABSTRACT

Security auditing of an application is performed based on object data associated with the application. An application is executed on a physical or emulated host device, and assembly code is generated for the executing application. The assembly code is analyzed to identify objects associated with the application, and to identify relationships between the objects. Data stored in member variables of the objects is retrieved by setting analysis points at which to extract member variable data during execution of the application. Based on the object data, relationship data, and retrieved member variable data, potential security risks are identified for the application. Security risks may include access of data on the host device and external communication of the accessed data. The application may be instrumented to include logging functionality, or to disable certain features of the application, and deployed to enable further monitoring for security risks.

24 Claims, 14 Drawing Sheets

(56) References Cited

U.S. PATENT DOCUMENTS

| | | | |
|---|---|---|---|
| 2003/0221184 A1 | | 11/2003 | Gunjal et al. |
| 2004/0194072 A1 | | 9/2004 | Venter |
| 2005/0273776 A1 | | 12/2005 | Guilford |
| 2005/0278707 A1 | | 12/2005 | Guilford |
| 2006/0059253 A1 | * | 3/2006 | Goodman et al. ............ 709/223 |
| 2006/0242709 A1 | * | 10/2006 | Seinfeld et al. ................. 726/24 |
| 2007/0240217 A1 | * | 10/2007 | Tuvell et al. ..................... 726/24 |
| 2007/0288644 A1 | | 12/2007 | Rojas et al. |
| 2009/0150420 A1 | | 6/2009 | Towner |
| 2011/0047597 A1 | * | 2/2011 | Mahaffey et al. ................. 726/3 |
| 2011/0289483 A1 | * | 11/2011 | Williams et al. ............. 717/126 |
| 2012/0260344 A1 | * | 10/2012 | Maor et al. ...................... 726/25 |
| 2013/0060890 A1 | * | 3/2013 | Lee et al. ...................... 709/217 |
| 2013/0152047 A1 | | 6/2013 | Moorthi et al. |
| 2013/0185798 A1 | * | 7/2013 | Saunders et al. ................. 726/24 |
| 2013/0227636 A1 | * | 8/2013 | Bettini et al. ..................... 726/1 |
| 2013/0276061 A1 | * | 10/2013 | Chebiyyam et al. ............. 726/3 |
| 2013/0282892 A1 | * | 10/2013 | Levi et al. ..................... 709/224 |
| 2014/0020096 A1 | * | 1/2014 | Khan et al. ....................... 726/22 |
| 2014/0082729 A1 | * | 3/2014 | Shim et al. ...................... 726/23 |

OTHER PUBLICATIONS

"Debugserver", [online] [retrieved on Apr. 22, 2014] Retrieved from the Internet: <http://iphonedevwiki.net/index.php/Debugserver>.

Chowdhury, "Non Final Office Action dated Feb. 13, 2014", U.S. Appl. No. 13/631,919, The United States Patent and Trademark Office, Feb. 13, 2014.

lldm.llvm.org, "The LLDB Debugger", [online] [retrieved Apr. 22, 2014] Retrieved from the Internet: <http://lldb.llvm.org/>.

Charles Lu, "Debug Java applications remotely with Eclipse", developerWorks, IBM, Dec. 9, 2008, [online] [retrieved on Apr. 22, 2014] Retrieved from the Internet: <http://www.ibm.com/developerworks/library/os-eclipse-javadebug/index.html>.

Javin Paul, "How to setup Java remote debugging in Eclipse", Javarevisited—Blog about Java programming language, FIX Protocol, Tibco Rendezvous and related Java technology stack, Feb. 25, 2011, [online] [retrieved Apr. 22, 2014] Retrieved from the Internet: <http://javarevisited.blogspot.com/2011/02/how-to-setup-remote-debugging-in.html>.

Bakos, et al., "Lightweight Error Correction Coding for System-Level Interconnects", IEEE Transactions on Computers, vol. 56, No. 3, Mar. 2007, pp. 1-16 [online], [retrieved on Jul. 2, 2014]. Retrieved from the Internet <URL:http://kona.ee.pitt.edu/steve/Recent%20Publications/TC_2007_TC-0414-1105-1.pdf>.

Chowdhury, "Notice of Allowance dated Jul. 2, 2014", U.S. Appl. No. 13/631,919, The United States Patent and Trademark Office, Jul. 2, 2014.

Coyer, "Non Final Office Action dated Jun. 5, 2014", U.S. Appl. No. 13/721,632, The United States Patent and Trademark Office, Jun. 5, 2014.

Dearle, "Software Deployment, Past, Present and Future", IEEE 2007, pp. 1-16 [online], [retrieved on Jul. 2, 2014]. Retrieved from the Internet <URL:http://www.cs.tufts.edu/comp/250SA/papers/dearle2007.pdf>.

Guglielmo, et al., "Model-Driven Design and Validation of Embedded Software", 2011 ACM, pp. 98-104 [online], [retrieved on Jul. 2, 2014]. Retrieved from the Internet <URL:http://dbonline.igroupnet.com/ACM.TOOLS/Rawdata/Acm1106/fulltext/1990000/1982616/p98-guglielmo.pdf>.

Rueher, et al., "Capturing Software Processes Through the Generated Objects", 1988, pp. 148-152 [online], [retrieved on Jul. 2, 2014]. Retrieved from the Internet <URL:http://delivery.acm.org/10.1145/80000/75138/p148-rueher.pdf>.

* cited by examiner

1000

RULES FOR IDENTIFYING SECURITY RISK(S) 126

RULES FOR COMMUNICATIONS 1002
- SECURITY RISK IF OBJECT COMMUNICATES WITH EXTERNAL ENTITIES NOT ON WHITE LIST
- SECURITY RISK IF OBJECT COMMUNICATES WITH EXTERNAL ENTITIES ON BLACK LIST
- SECURITY RISK IF OBJECT COMMUNICATES PARTICULAR TYPE(S) OF DATA TO EXTERNAL ENTITY
- SECURITY RISK IF OBJECT INTERNALLY COMMUNICATES WITH OTHER APP(S) ON HOST DEVICE

⋮

RULES FOR DATA ACCESS 1004
- SECURITY RISK IF OBJECT ACCESSES DATA FROM PARTICULAR MODULE(S) ON HOST DEVICE
- SECURITY RISK IF OBJECT ACCESSES PARTICULAR TYPE(S) OF DATA FROM MODULE(S) ON HOST DEVICE
- SECURITY RISK IF THIRD PARTY OBJECT ACCESSES DATA FROM PARTICULAR MODULE(S) ON HOST DEVICE
- SECURITY RISK IF OBJECT ACCESSES DATA ON A NETWORK DEVICE ACCESSIBLE TO THE HOST DEVICE

⋮

RULES FOR DATA TRANSFER 1006
- SECURITY RISK IF OBJECT ACCESSES DATA FROM MODULE(S) ON HOST DEVICE AND TRANSFERS DATA TO OBJECT(S) THAT COMMUNICATE EXTERNALLY
- SECURITY RISK IF OBJECT ACCESSES DATA FROM MODULE(S) ON HOST DEVICE AND TRANSFERS DATA TO CERTAIN OTHER APP(S) ON HOST DEVICE
- SECURITY RISK IF OBJECT TRANSFERS DATA FROM PARTICULAR MODULE(S) ON HOST DEVICE TO THIRD PARTY OBJECT

APPLICATION AUDITING THROUGH OBJECT LEVEL CODE INSPECTION

BACKGROUND

With the growing popularity of mobile devices, there is an increasing demand for applications, or apps, to run on such devices. Unfortunately, publicly distributed apps may include malware, spyware, or other types of malicious software configured to compromise system security. Such non-secure applications may lead to theft of a user's personal, financial, or other sensitive data. Moreover, in cases where an employee uses a personal device to access an employer's corporate network, installation of malicious applications on the device may lead to a breach in corporate security and potentially large economic losses for the corporation. Traditional security auditing solutions monitor an application as it executes on an end-user's device. However, such solutions may allow a security breach and data leakage from the device before the security breach is detected and stopped.

BRIEF DESCRIPTION OF THE DRAWINGS

FIG. 10 depicts example rules for identifying security risks.

Figure 1:
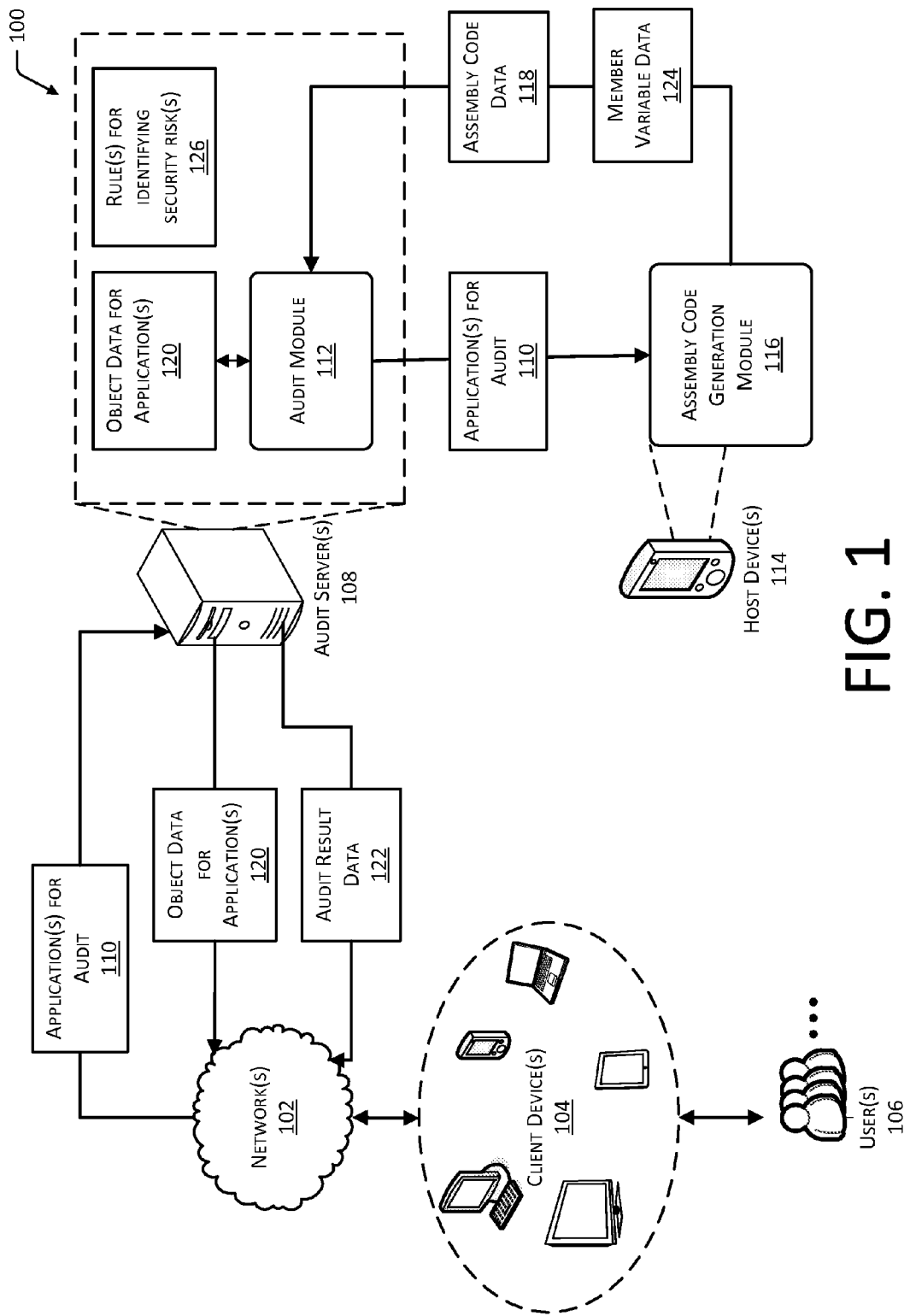
FIG. 1 depicts an environment for application security auditing through object level code inspection.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Overview

This disclosure describes embodiments of systems, methods, and computer-readable media to enable forensics, validation, testing, and auditing of an application using object data for the application. An application may be installed on a host device, and executed in conjunction with an assembly code generation module to generate assembly code data. Object data may then be extracted from the assembly code data, the object data including a description of objects associated with the application and relationships between the objects. As used herein, objects may describe static or dynamic program objects, classes, libraries, data structures, and objects instantiated or accessed during execution of an application. In some cases, relationships between objects may be hierarchical, evincing a parent-child inheritance relationship.

The object data may be analyzed to identify potential security risks associated with executing the application on a device. Embodiments support auditing of any type of software application, program, module, or process executing on, or part of, any type of operating system. For example, applications may be audited which are configured for execution on mobile, desktop, laptop, server, or other devices and their corresponding operating systems.

As described herein, auditing the application may include identifying one or more security risks associated with execution of the application. Identification of security risks may indicate that the application under audit includes features that may lead to data corruption, data destruction, data theft, data leakage, or data intrusion on the host device or on a networked device in communication with the host device.

For example, auditing an application may include analyzing object data of the application to identify objects which perform communications with external devices or services while executing on the host device, where such external devices or services are deemed untrustworthy based on their presence on a black list or their absence from a white list. Auditing may also include analyzing object data to identify objects which access data on the host device, including data from the host device's phone book, address book, location information, file system, or other data on the host device. Auditing may also include analyzing object data to identify transfers of data from object(s) that accesses host device data to object(s) that communicate that data externally outside the host device. Security risks may be identified based on the external communications, host device data access, a combination of host device data access and external communication, or other activities of the application being audited.

Object level analysis may be performed by identifying analysis points in member methods of objects associated with the application, such that the assembly code generation module outputs contents of member variables of the objects while the application is executing. When the executing application reaches an analysis point set in a member method of an object, the contents of one or more member variables of the object may then be extracted and analyzed to determine what data is being sent, received, or stored by the object, or what data is being retrieved from the host device or communicated externally by the object. Based on the data being retrieved or communicated by the application, embodiments may identify security risks associated with the application. In some embodiments, data extraction and analysis, and identification of security risks, may be performed in real time during an execution of the application on the host device.

The audit server may remotely operate the host device to upload the application to the host device, install the application on the host device, and execute the application on the host device to identify security risks. The audit server may also remotely operate the host device to execute an assembly code generation module on the host device. In some embodiments, the assembly code generation module generates assembly code data associated with the executing application. The assembly code data may include assembly code instructions, assembly code descriptions of program objects associated with the application, or both. In some embodiments, the assembly code generation module is a debugger or includes functionality of a debugger to set breakpoints, set analysis points, extract or modify data stored in variables, output assembly code for the application, and so forth.

In some embodiments, an audit module on the audit server builds an object level hierarchy for the application, based on the assembly code generated by the assembly code generation module on the host device. In some cases, the audit server may iteratively query the assembly code on the host device to determine parent/child hierarchical relationships between various objects associated with the application. This hierarchical object data may then be employed to perform a security audit of the application.

In some embodiments, a user may log in or otherwise be authenticated to an audit server. Through a user interface (UI) provided by the audit server, the user may specify and upload an application for auditing, and select a host device on which the application is to be audited. The selection of the host device may include selection of one or more of a particular device, device type, operating system, or other attributes of the host device. The UI may further provide a report listing the security risks, if any, that have been identified through execution of the application on the host device. In addition to or instead of providing the report through the UI, some embodiments may provide a report of the identified security risks in an email, a transferred file, or other through means. The report may be presented to the user on completion of the audit, or stored for later access.

In some embodiments, an instrumented version of the application may be created to enable further monitoring of the application for security risks. Additional assembly code may be injected into the application in those objects identified as performing actions that are security risks. Such additional assembly code may write log data to local storage on a device while the application is running. The log data may include the data which is accessed by the application on the host device or communicated by the application to another application or to an external device or service. The log data may periodically be transferred to the audit server or other device, and analyzed to identify potential security risks. In some embodiments, the original assembly code of the application may be modified to disable one or more application features associated with security risks. Following such modifications, an instrumented version of the application may be compiled from the original assembly code, the additional assembly code, and the modified assembly code, and provided to an end-user in a binary, executable format.

In some embodiments, the extracted object data for an application may be employed to generate network traffic for load testing of services running on backend servers. For example, the application under audit may be a client application communicating with a service running on a backend enterprise server, such as a banking web site, e-commerce web site, and so forth. The object data extracted during execution of the application may be analyzed to identify transactions sent to the backend server, such as requests, posts, or other communications interacting with the service running on the backend server. Transactional data from such transactions may be captured and played back from one or more test servers to test the service running on the backend server. The load may be increased or decreased to test various load environments, and the reply traffic may be analyzed and compared with a baseline of expected responses. In some cases, the load generated from one or more test servers may be supplemented with traffic from the host device(s).

Embodiments are described further herein with reference to the figures.

Illustrative Environment

FIG. 1 shows an example environment 100 in which various embodiments of application auditing may operate. In embodiments, the various devices and modules of the environment 100 may communicate with one another and with external devices via one or more networks 102. Such networks 102 may include public networks such as the Internet, private networks such as an institutional or personal intranet, or some combination of private and public networks. The networks may also include any type of wired or wireless network, including but not limited to local area networks (LANs), wide area networks (WANs), Wi-Fi, WiMax, and mobile communications networks (e.g. 3G, 4G, and so forth). The networks may utilize communications protocols, including packet-based or datagram-based protocols such as internet protocol (IP), transmission control protocol (TCP), user datagram protocol (UDP), or other types of protocols.

In some embodiments, the environment 100 includes one or more client devices 104 that are owned by, operated by, or otherwise associated with one or more users 106. The client devices 104 may include any type of computing device that is able to communicate with other devices over a network, including but not limited to desktop computers, personal computers, laptop computers, tablet computers, electronic book readers, wearable computers, implanted computers, mobile phones, thin clients, terminals, game consoles, mobile gaming devices, and the like. In some embodiments, the client devices 104 include one or more applications that provide a user interface to connect with a remotely hosted service. For example, the client devices 104 may run a web browser to enable the user(s) 106 to view and interface with a web site.

Embodiments support the use of various web browsers including, but not limited to, Mozilla® Firefox®, Microsoft® Internet Explorer®, Google® Chrome®, Apple® Safari®, Rockmelt®, and other browsers. In some embodiments the user(s) 106 may communicate with a remote service via some other type of application, or through a dedicated client-side application. The user(s) 106 may include any individual person, group of persons, or automated process. For example, the user(s) 106 may include app developers, software engineers, other members of an application development organization, and the like, who may employ embodiments to validate an application during or after its development process.

In some embodiments, the environment 100 includes one or more server computing devices. Such servers may include any type of computing device including, but not limited to, network servers, rack-mounted servers, workstations, desktop computers, laptop computers, tablet computers, mobile computing devices, virtual servers, cloud resources, and the like. Further, the servers shown may include one or more computing devices that operate in a cluster or other grouped configuration to share resources, balance load, increase performance, provide fail-over support or redundancy, or for other purposes. The servers may also include one or more hardware modules and one or more software modules (e.g., processes or applications) to perform tasks as described herein.

As shown in FIG. 1, the environment 100 includes one or more audit servers 108. In embodiments, the audit server(s) 108 may receive (e.g., from users 106) one or more applications for audit 110. In some embodiments, the audit server(s) 108 run one or more software modules, processes, or applications that comprise an audit module 112. In some embodiments, the audit module 112 may provide a user interface that is accessible to the user(s) 106, e.g., through a web browser executing on the client devices 104. The user interface may enable a user to send instructions and receive data associated with application validation and auditing operations. An example user interface for the application validation service is described with regard to FIG. 4.

The environment 100 may also include one or more host devices 114 available for performing application validation operations. Such host device(s) 114 may include various types of computing devices, operating systems, software, firmware, and so forth. In some embodiments, the host device(s) 114 include mobile computing devices such as smartphones, tablets, electronic book (eBook) readers, wearable computers, automotive computers, and the like. However, embodiments are not so limited, and embodiments may support any type of host device for application validation, including but not limited to desktop computers, laptop computers, network computers, server computers, mainframe computers, and so forth. In some embodiments the host device 114 may be emulated in software. For example, the host device 114 may comprise a software emulator of the host device 114 which is executed on the audit server 108 or another server.

In embodiments, the host device(s) 114 may include one or more software modules such as an assembly code generation module 116. In some embodiments, the audit module 112 transmits or otherwise provides the application(s) for audit 110 to the host device(s) 114, to enable the application(s) to be validated and audited while executing on one or more of the host device(s) 114. In some embodiments, the application(s) for audit 110 may be provided to the host device(s) 114 from a computing device other than the audit server(s) 108 or from an online app store. The application(s) for audit 110 may be executed on the host device(s) 114, and the assembly code generation module 116 may produce assembly code associated with the executing applications. In some embodiments, the assembly code generation module 116 may be a debugger such as the GNU debugger (gdb), or may include at least a portion of the functionality of a debugger. However, embodiments are not so limited, and any type of the assembly code generation module 116 may be employed to generate the assembly code data 118 for an application or verify that a compiled application is suitable for the hardware configuration of the host device 114 on which it is to execute. In some embodiments, the application(s) for audit 110 include application(s) in binary or executable form, and may not include source code for the application(s). In some embodiments, the application(s) for audit 110 may be received in a compressed or archived format, such as an IPA or ZIP file.

In some embodiments, the assembly code generation module 116 generates the assembly code data 118 associated with the application(s) for audit 110 while such applications are executing on the host device(s) 114. The assembly code data 118 may be transferred to the audit module 112, which may then use the assembly code data 118 to generate object data 120 associated with the application(s) for audit 110. In some embodiments, the object data 120 may indicate a hierarchical association between the plurality of objects, based on one or more determined parent-child relationships between the objects. Such object level hierarchy data may be generated as described in U.S. patent application Ser. No. 13/631,919, filed on Sep. 29, 2012, titled "Application Validation Through Object Level Hierarchy Analysis," which is incorporated by reference into this disclosure.

In some embodiments, the audit module 112 may perform any number of requests for portions of the assembly code data 118. The audit module 112 may then analyze address data for objects listed in the assembly code data 118 to determine relationships, calls, or data transfers between the objects. As used herein, address data describes addresses for locations in virtual memory on the device where the application for audit 110 is executing. Address data may also describe addresses for locations in active memory or program memory on a device. The generated object data 120 may be stored on the audit server(s) 108, or on a data storage device or other computing device external to and in communication with the audit server(s) 108. For example, the object data 120 may be provided to the client device 104 for further analysis.

In some embodiments, the object data 120 is employed to determine one or more analysis points to set within objects associated with the application(s) for audit 110, the objects included in the object data 120. Analysis points may be associated with particular member variables of the objects, to enable the assembly code generation module 116 to extract the values of the member variables during execution of the application for audit 110. The extracted member variable data 124 may be provided to the audit module 112, which analyzes the member variable data 124 to identify one or more security risks associated with the application for audit 110. Use of the member variable data 124 to identify security risks is described further herein with reference to FIGS. 7-9.

The audit module 112 may also analyze the object data 120 to validate and audit the application(s) for audit 110. Such validation and auditing may result in audit result data 122, which may be provided to the user(s) 106 through a user interface of the audit module 112 or through a report, or may be stored on the audit server(s) 108 and made available in response to a request for the audit result data 122. In some embodiments, the audit result data 122 may include at least a portion of the object data 120, or the object data 120 may be provided to the client device 104 separately from the audit result data 122. The audit result data 122 or the provided object data 120 may also include metadata describing data elements within the object data 120. In some embodiments, audit result data 122 may include one or more security risks identified for the application, determined while performing auditing operations on the application as described further herein.

As described herein, security risks may include identified actions of the application that are suspicious, inappropriate, outside an expected scope of operations for the application, or that otherwise merit scrutiny. In some embodiments, security risks may be identified by the audit module 122 based on the application of one or more rules for identifying security risks 126, which may be stored on the audit server(s) 108. Security risks of an application may include the application initiating a communications session or connection with a remote entity such another device, another process on the same device, a remote process, or a remote user. A security risk may include the transfer of data to such a remote entity, or the receipt of data from a remote entity. In some cases, the external communication itself may be deemed a security risk. In some cases, the communication may be deemed a security risk based on the remote entity being identified as untrustworthy. The remote entity may be identified based on an identifier associated with the remote entity (e.g., a network address) being on a black list of known untrustworthy sites, or based on the identifier being absent from a white list of known trusted sites.

Security risks may also include the application accessing data from another application, process, or module on the host device, such as a phone book, address book, location module, camera module, microphone module, data storage, or other module. A security risk may include the application providing the data retrieved from the host device to another application running on the host device. In some cases, a security risk may include the application accessing data stored on a cloud-based device that is accessible to the host device over a network. For example, a security risk may be determined where the application is employing the host device's access to a network email server to retrieve messages or other data from the network server. In some cases, the access itself to data on the host device or on a cloud server is a security risk. In some cases, the nature of the data may determine whether the access is a security risk. For example, the application's access of personal, private, sensitive, health-related, financial, secure, encrypted, location, or other types of data may be identified as a security risk.

In some embodiments, various operations of the assembly code generation module 116 or other operations of the host device(s) 114 may be remotely controlled from the audit server(s) 108. In some cases, the remote control may be accomplished through systems and methods described in U.S. patent application Ser. No. 13/619,867, filed on Sep. 14, 2012, titled "Remote Control of a Mobile Device," which is incorporated by reference into this disclosure. In some embodiments, the audit server(s) 108 may include functionality of the remote control server(s) described in "Remote Control of a Mobile Device," or may communicate with such remote control server(s), to send instructions to or receive data from the host device(s) 114.

In some embodiments, the application validation operations described herein may be performed using an emulation of a host device, instead of or in addition to using a physical host device 114. An emulation of a host device may execute on the audit server(s) 108 or on another computing device, and may run an operating system or applications that would otherwise execute on the physical host device 114. In such cases, the application(s) for audit 110 may be copied to, installed on, and executed on the emulation of the host device 114, and the assembly code generation module 116 may execute on the emulation to generate the assembly code data 118.

In some implementations the emulation may be configured to provide the assembly code data 118 without an additional or separate assembly code generation module 116. For example, the emulator may be configured to output the assembly code data 118 for the applications executing in the emulator to the operating system within which the emulator is executing.

Illustrative Computing Systems

Figure 2:
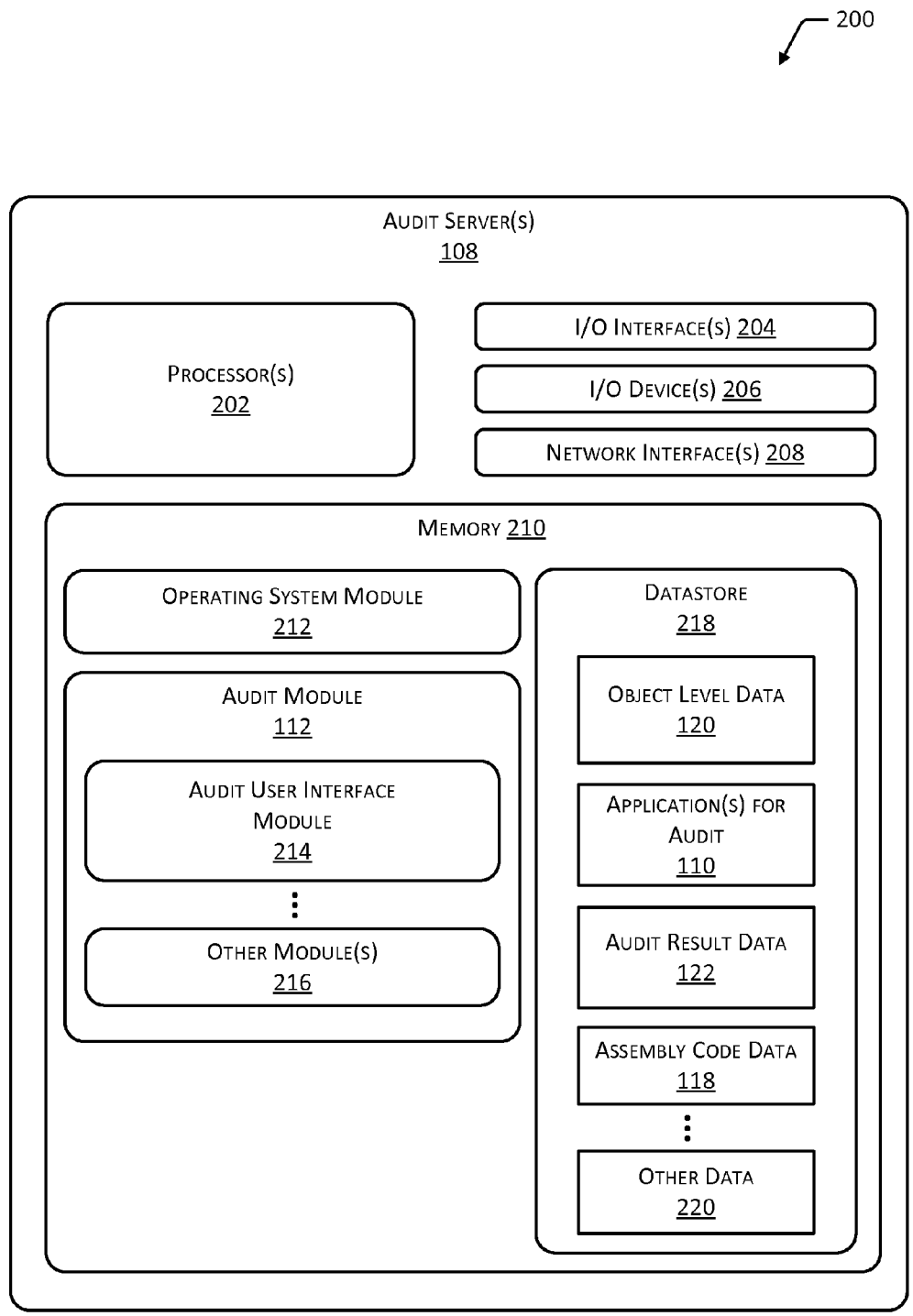
FIG. 2 depicts a block diagram of an audit server device configured to perform operations for application security auditing.

FIG. 2 depicts a block diagram 200 of the audit server(s) 108 that may be used to implement various embodiments described herein. The audit server(s) 108 may include one or more processors 202 configured to execute one or more stored instructions. The processors 202 may comprise one or more cores.

The audit server(s) 108 may include one or more input/output (I/O) interface(s) 204 to allow the audit server(s) 108 to communicate with other devices. For example, the I/O interface(s) 204 may be configured to provide a universal serial bus (USB) connection compliant with the standards promulgated by the USB Implementers Forum, Inc. of Beaverton, Oreg.

The I/O interface(s) 204 may couple to one or more I/O devices 206. The I/O device(s) 206 may include user input devices such as one or more of a keyboard, a mouse, a pen, a game controller, a voice input device, a touch input device, a gestural input device, the one or more host devices 114, and so forth. The I/O device(s) 206 may include output devices such as one or more of a display, a printer, audio speakers, haptic output device, and so forth. In some embodiments, the I/O device(s) 206 may be physically incorporated with the audit server(s) 108 or be externally placed.

The audit server(s) 108 may also include one or more network interfaces 208 to enable communications between the audit server(s) 108 and other networked devices such as those depicted in FIGS. 1 and 10. Such network interface(s) 208 may include one or more network interface controllers (NICs) or other types of transceiver devices configured to send and receive communications over the network(s) 102. The audit server(s) 108 may also include one or more busses or other internal communications hardware or software that allow for the transfer of data between the various modules and components of the audit server(s) 108.

As shown in FIG. 2, the audit server(s) 108 includes one or more memories 210. The memory 210 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 210 provides storage of computer readable instructions, data structures, program modules, and other data for the operation of the audit server(s) 108.

The memory 210 may include at least one operating system (OS) module 212. The OS module 212 is configured to manage hardware resources such as the I/O interface(s) 204 and provide various services to applications or modules executing on the processor(s) 202.

In some embodiments, the OS module 212 may comprise a distribution or variant of the Linux® operating system originally released by Linus Torvalds. In the example shown, the memory 210 includes an audit module 112 to perform auditing, validation, application instrumentation, load testing, and other types of actions for embodiments described herein. In some embodiments, the audit module 112 includes an audit user interface module 214. The audit user interface module 214 may be configured to provide an application programming interface, graphical user interface (GUI), command-line user interface (CUI), web interface, or other facility to allow the client device 104 to communicate with the audit module 112. The audit user interface module 214 enables the user 106 to provide input and receive output associated with the host device 114 and the operations of the host device 114. The audit user interface module 214 may accept application(s) for audit, an identification of a host device for validation, and so forth. The audit user interface module 214 may also present object data 120, data related to particular objects or attributes of objects, or audit result data 122. The audit user interface module 214 is described further with reference to the example interface shown in FIG. 4 below. Operations of the audit module 112 are described further below with reference to FIGS. 5-12.

Other modules 216 may also be included in the audit server(s) 108. These other modules 216 may include, but are not limited to, user authentication modules, access control modules, billing modules, and so forth.

In some embodiments, the memory 210 also includes a datastore 218 to store information for operations of the audit server(s) 108. The datastore 218 may comprise a database, array, structured list, tree, or other data structure. The datastore 218 may store the object data 120, the application(s) for audit 110 received from the client device(s) 104, the audit result data 122 sent to the client device(s) 104, and the assembly code data 118 received from the host device(s) 114. Other data 220 may also be stored in the datastore 218, such as user account or authentication information, test scripts or other test input data, debugging results, operational audit data, and so forth.

Figure 3:
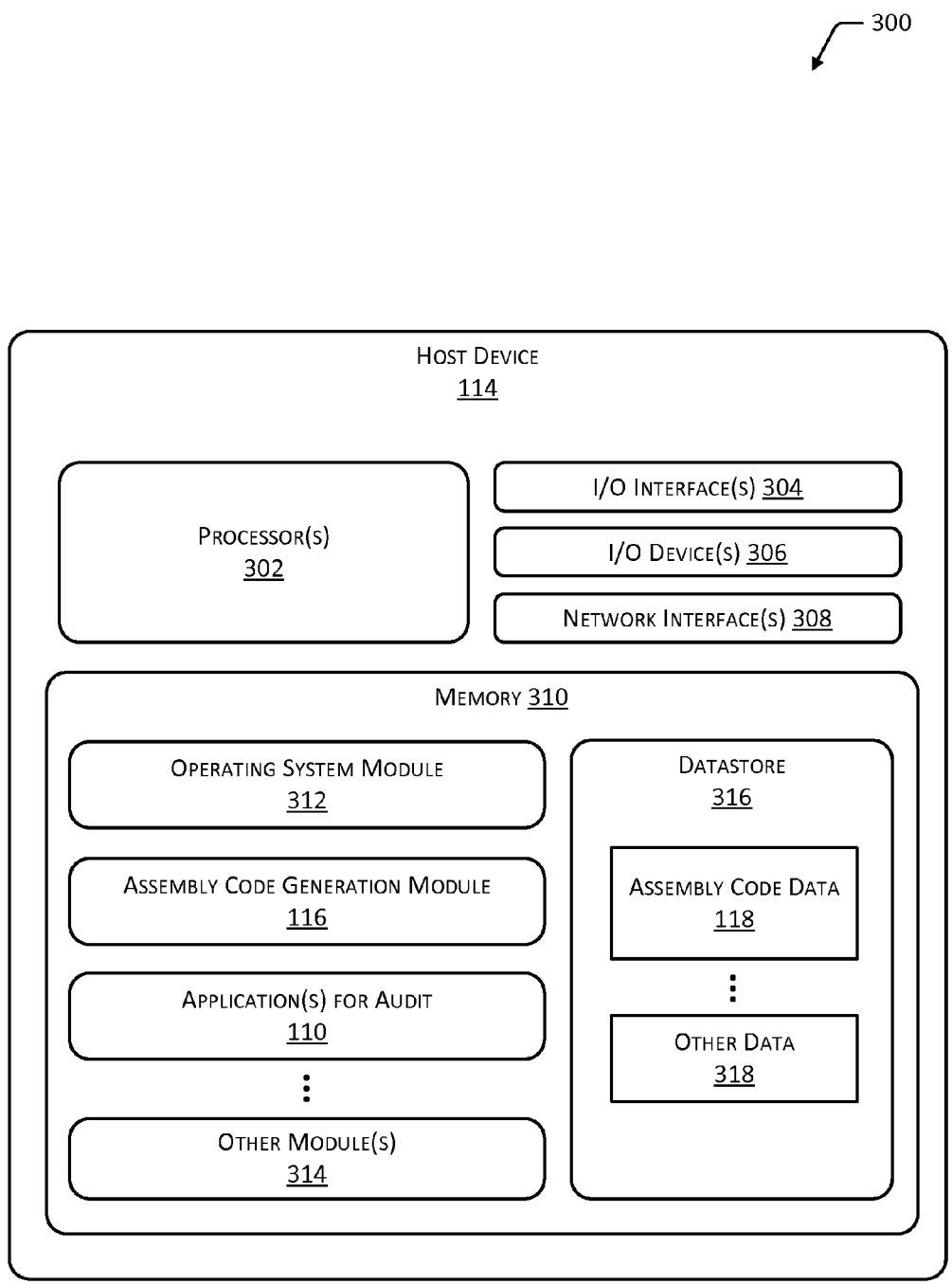
FIG. 3 depicts a block diagram of the host device configured to perform operations for application security auditing.

FIG. 3 depicts a block diagram 300 of a host device 114 that may be used to implement various embodiments described herein. The host device 114 may include one or more processors 302 configured to execute one or more stored instructions. The processors 302 may comprise one or more cores.

As described with regard to the audit server(s) 108, the host device 114 may include one or more input/output (I/O) interfaces 304 to allow the host device 114 to communicate with other devices such as those shown in FIGS. 1 and 10. In some embodiments, the I/O interface(s) 304 may be configured to provide a universal serial bus (USB) connection.

The I/O interface(s) 304 may couple to one or more I/O devices 306. The I/O device(s) 306 may include user input devices such as one or more of a keyboard, a mouse, a pen, a game controller, a voice input device, a touch input device, a gestural input device, one or more accelerometers, one or more gyroscopes, the audit server(s) 108, and so forth. The I/O device(s) 306 may include output devices such as one or more of a display, a printer, audio speakers, haptic output device, and so forth. In some embodiments, the I/O device(s) 306 may be physically incorporated with the host device 114 or be externally placed.

The host device 114 may also include one or more network interfaces 308 (e.g., NICs) configured to send and receive communications over the network(s) 102. The host device 114 may also include one or more busses or other internal communications hardware or software that allow for the transfer of data between the various modules and components of the host device 114.

As shown in FIG. 3, the host device 114 includes one or more memories 310. The memory 310 comprises one or more CRSM, as described above in FIG. 2. The memory 310 may include at least one operating system (OS) module 312. The OS module 312 is configured to manage hardware resources such as the I/O interface(s) 304 and provide various services to applications or modules executing on the processor(s) 302. The OS module 312 may comprise one or more mobile operating systems configured for execution on mobile computing devices. The OS module 312 may implement one or more of iOS® from Apple Corp. of Cupertino, Calif.; Windows Mobile® from Microsoft Corp. of Redmond, Wash.; Android® from Google, Corp. of Mountain View, Calif. and its derivatives from various sources; Palm OS® from Palm Computing, Inc. of Sunnyvale, Calif. and its derivatives from various sources; BlackBerry OS® from Research In Motion Ltd. of Waterloo, Ontario, Canada; or other operating systems such as VxWorks from Wind River Systems of Alameda, Calif. In cases where the OS module 312 implements a version of iOS®, any version of iOS® may be supported including iOS 1.x, 2.x, 3.x, 4.x, 5.x, 6.x, or higher versions, including any version of iOS® for the iPhone®, iPad®, iPad Touch®, or any other compatible device. In cases where the OS module 312 implements a version of Android®, any version of Android® may be supported including but not limited to versions 2.3.x "Gingerbread," 4.0.x "Ice Cream Sandwich," 4.1.x "Jelly Bean," and so forth. The memory 310 may include the assembly code generation module 116, the application(s) for audit 110, and other module(s) 314.

The memory 310 also includes a datastore 316 to store information for operations of host device 114. The datastore 316 may comprise a database, array, structured list, tree, or other data structure. The datastore 316 may store the assembly code data 118 generated by the assembly code generation module 116. Other data 318 may also be stored, such as user account information, network connectivity data, and so forth.

Illustrative User Interface

Figure 4:
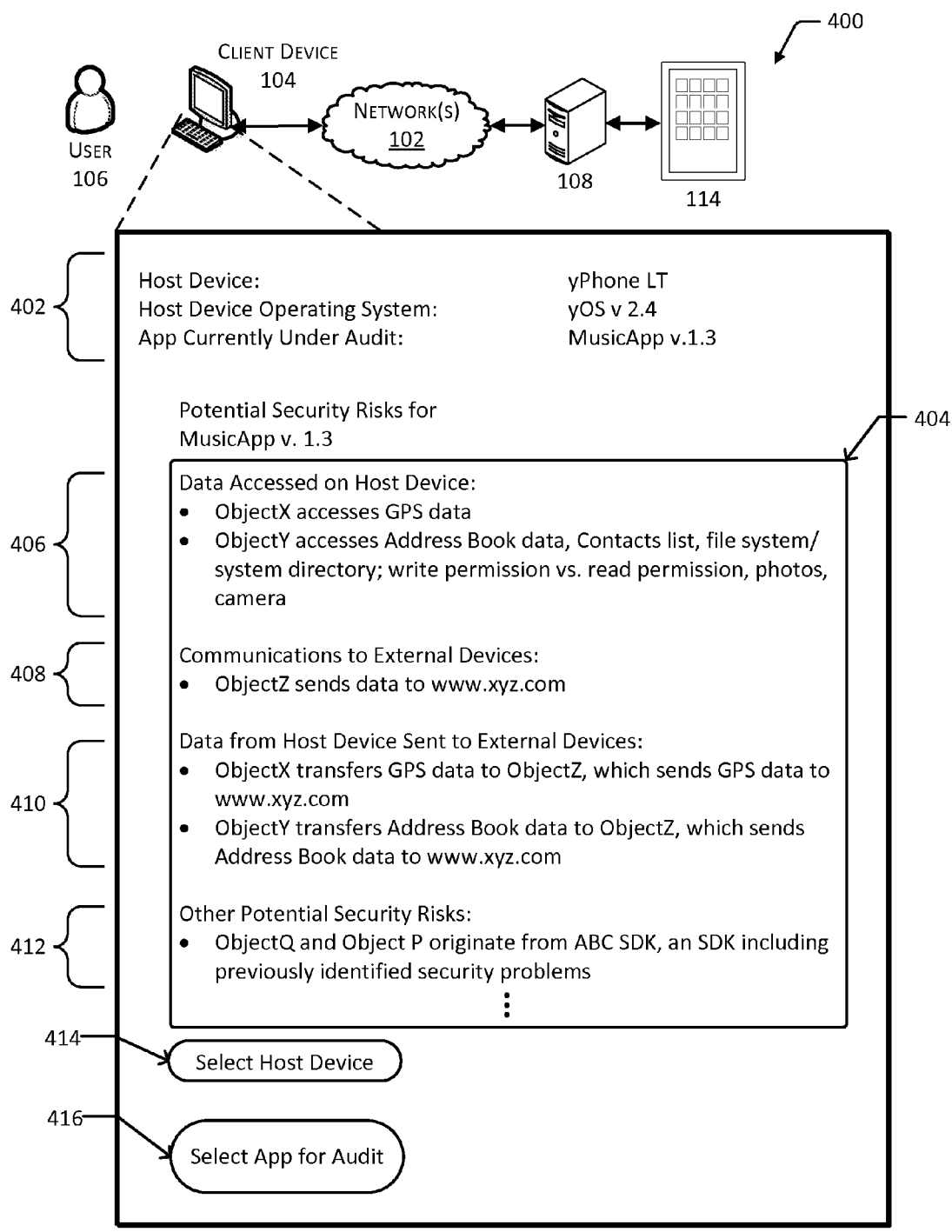
FIG. 4 depicts a user interface to manage application security auditing as described herein.

FIG. 4 depicts an example user interface 400 for the audit user interface module 214 of the audit module 112. In some embodiments, the interface 400 comprises a web interface suitable for viewing within a web browser running on a client device 104 of a user 106. In some implementations, the data provided by the interface 400 may be copied into a file and reported to a user 106 in the file, in an email, or through other means. For example, the object data 120, the audit result data 122, or both may be provided to the client device 104 using the network 102. In some implementations, the data provided by the interface 400 may be stored in a file or other data format or structure, and provided to a user or process in response to a request.

The interface 400 may include a summary section 402, describing characteristics of the host device 114 or other aspects of the security auditing environment. For example, as shown in FIG. 4, the summary section 402 may include information for a device type, brand, model, or processor architecture of the host device 114, an OS and OS version for the OS running on the host device 114, one or more particular applications, apps or other processes currently executing on the host device 114 (e.g., apps undergoing a security audit), and so forth.

In some embodiments, the interface 400 may include a graphical or textual report 404, indicating one or more security risks identified based on the security audit of the application. In the example shown, the report 404 includes security risks 406 indicating objects that access data on the host device 114, and the types of data accessed such as address book data, phone book data, financial records data, or other types of sensitive, personal, or private data. The types of data accessed may include location data, e.g., from a module that employs the Global Positioning System (GPS) to determine location information for the host device 114.

The report 404 may also include security risks 408 indicating objects that communicate with devices, sites, services, or individuals that are external to the host device 114. In the example shown, a security risk 408 indicates that ObjectZ of the application sends data to a web site www.xyz.com. The report 404 may also include security risks 410, indicating a data transfer or other interaction between objects that access data on the host device 114 and objects that communicate with external entities. In some cases, the security risks 410 may also indicate that the data being externally communicated includes the data retrieved from the host device 114.

Report 404 may also include other potential security risks 412. For example, as shown in FIG. 4, the other potential security risks 412 include an identification of two objects, ObjectQ and ObjectP, which originate from a particular software development kit (SDK) or third-party software library that has previously been correlated with security risks. In some cases, a security risk may be identified based on an object or class originating from outside a collection of known safe software libraries. For example, objects or classes that are not standard iOS® objects or classes may be identified as security risks.

The interface 400 may also include one or more controls 414 (e.g., buttons, drop-down lists, etc.) that enable a user to select a host device and host device operating system on which to generate assembly code data to be used for auditing. Control(s) 414 may display a list of host devices and host device operating systems available for auditing operations. In some embodiments, the interface 400 may include one or more controls 416 to enable a user to select and upload an application to be audited, from the client device 104 to the audit server(s) 108.

Although FIG. 4 shows an example interface with various user interface elements in particular positions, the particular example arrangement shown is not in any way limiting of embodiments. Accordingly, various embodiments may employ a user interface that includes more or fewer user interface elements or controls, in any combination and in any arrangement to enable functionality of the embodiments. Further, embodiments may support multiple user interfaces (e.g., multi-page web sites) with functionality spread across various pages. Embodiments may also support dynamically generated interfaces, where the particular user interface elements displayed and the location or duration of their display is based on a particular state of the system, particular characteristics of the user or the local client device, or other factors.

Illustrative Application for Audit

Figure 5:
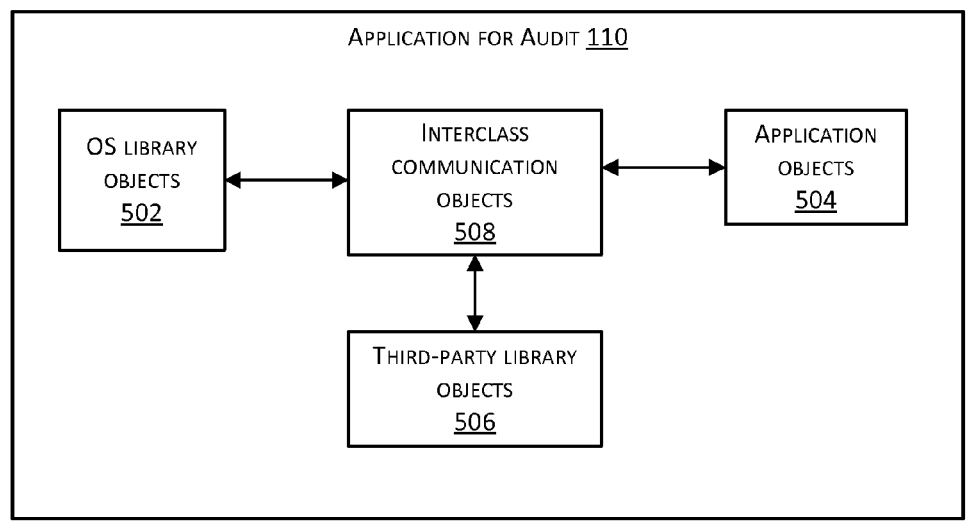
FIG. 5 depicts an example schematic for objects and object relationships in an application for audit.

FIG. 5 shows a schematic 500 of an example application for audit 110. In many cases, an application developer develops an application by designing and coding a set of classes or objects to include the functionality that is unique to the particular application she is creating. The application developer may also incorporate various existing software libraries, which may include classes or objects to perform operations that may be common across a variety of applications. The schematic 500 illustrates an example of the various types of objects that may be incorporated into an application for audit 110.

In the example shown, the application for audit 110 may include one or more OS library objects 502. These objects may include objects for accessing commonly used features of the OS or the host device 114, such as accessing the file system, address book, phone book, GPS system, camera, microphone, image store, or other data storage on the host device 114. For example, in cases where the application for audit 110 is to run on an iOS® platform, the OS library objects 502 may include iOS® library objects, frameworks, or classes.

The application for audit 110 may also include one or more application objects 504 created specifically to run within this application for audit 110. In some cases, application objects 504 may be modified somewhat from publicly available shareware or freeware software, or modified from other objects written to perform similar functions in other applications.

The application for audit 110 may also include one or more third-party library objects 506. Such objects may be incorporated into the application for audit 110 by the developer to perform actions. Third-party library objects 506 may be incorporated into the application for audit 110 from a software development kit (SDK) used by the developer to expedite development of the application. Third party library objects 506 may perform various functions, including but not limited to functionality for touch event processing, accelerometer support, localization, UI view processing, camera support, audio data processing, video or image data processing, networking, multi-process threading, power management, file system access, security, and so forth. For example, the third party library objects 506 may be incorporated from the iOS® SDK developed by Apple Corp. of Cupertino, Calif.

The application for audit 110 may also include one or more interclass communication objects 508, which mediate the transfer of data between any classes or objects of the OS library objects 502, the application objects 504, and the third party library objects 506. In cases where the application for audit 110 is written in the Objective-C programming language, the interclass communication objects 508 may implement the Objective-C interclass protocol.

Illustrative Processes

Figure 6:
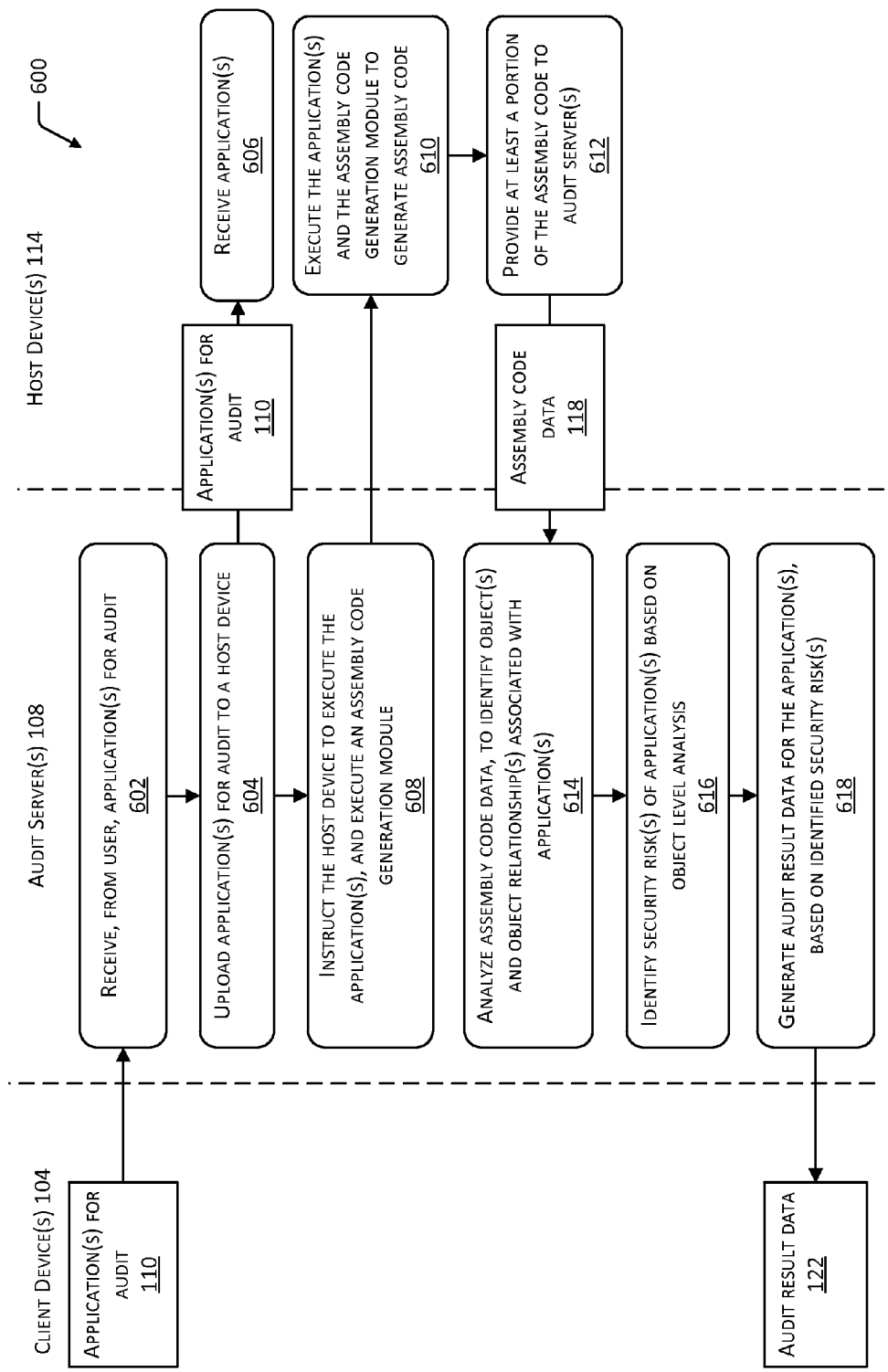
FIG. 6 depicts a flow diagram of a process for providing application(s) for audit to a host device and receiving assembly code data from the host device, which may be used to audit the application(s).

FIG. 6 depicts a flow diagram 600 of an example process for performing a security audit of an application, according to embodiments described in this disclosure. As shown in FIG. 6, the process includes operations performed on the audit server(s) 108 and operations performed on the host device(s) 114. In some embodiments, the operations performed on the audit server(s) 108 may be performed at least in part by the audit module 112 or its sub-modules, and the operations performed on the host device(s) 114 may be performed at least in part by the assembly code generation module 116, or other modules of the host device(s) 114. As described above, in some embodiments the host device 114 may be emulated, and the functions provided by the assembly code generation module 116 may be included in the emulation.

In the example shown in FIG. 6, at 602 the audit server(s) 108 may receive one or more applications for audit 110. For example, the user 106 may upload the application for audit 110 through the user interface presented on a client device 104. This user interface may be provided by the audit user interface module 214. At 604, the application(s) for audit 110 may be uploaded to a host device 114 specified by the user 106 for application security auditing. At 606, the application(s) for audit 110 are received by the host device 114. In some embodiments, uploading of the application(s) for audit 110 may also include operations to install the application(s) on the host device including file or folder creation, creating or modifying registry or configuration settings, creating GUI elements (e.g., icons), and so forth.

At 608, the audit server(s) 108 may instruct the host device 114 to execute the application(s) for audit 110, and to execute an assembly code generation module 116 to generate the assembly code data 118 associated with the application. At 610, the application(s) and the assembly code generation module 116 are executed on the host device 114. In some embodiments, one or more preliminary operations may be performed prior to execution of the application for audit 110. Such preliminary operations are described with reference to FIG. 11. The assembly code generation module 116 may operate to generate the assembly code data 118 associated with the executing application(s) for audit 110. In some embodiments, the assembly code data 118 may be stored locally on the host device 114 and retrieved by the audit server(s) 108. In some embodiments, the assembly code data 118 may be generated through a remote operation of the assembly code generation module 116 by the audit server 108, and the assembly code data 118 may be received at the audit server 108 in real time, as the assembly code data 118 is generated. At 612, at least a portion of the assembly code data 118 is provided to the audit server(s) 108.

At 614, the audit server(s) 108 receive the assembly code data 118 from the host device 114, and analyze the assembly code data 118 to identify object(s) associated with the application. The analysis may also determine relationships between the objects described in the assembly code data 118.

In some embodiments, this operation may include a series of iterated operations to retrieve object-related data from the host device 114. In some embodiments, the relationships determined are parent-child or other forms of inter-entity relationships such as "has-a" or "is-a" relationship between objects.

At 616, the object(s) are analyzed to identify security risks associated with operation of the application on the host device 114. Identification of security risks is described further herein with regard to FIGS. 7-9. At 618, audit result data 122 may be generated for the application, based on the one or more identified security risks. The audit result data 122 may be reported to the user 106 through the user interface provided by the audit user interface module 214 or through other modes of communication such as email, text messaging, file transfer over a network, and so forth. In some embodiments, the audit result data 122 may be stored on the audit server(s) 108 or elsewhere, and made available to a requesting user or process.

Figure 7:
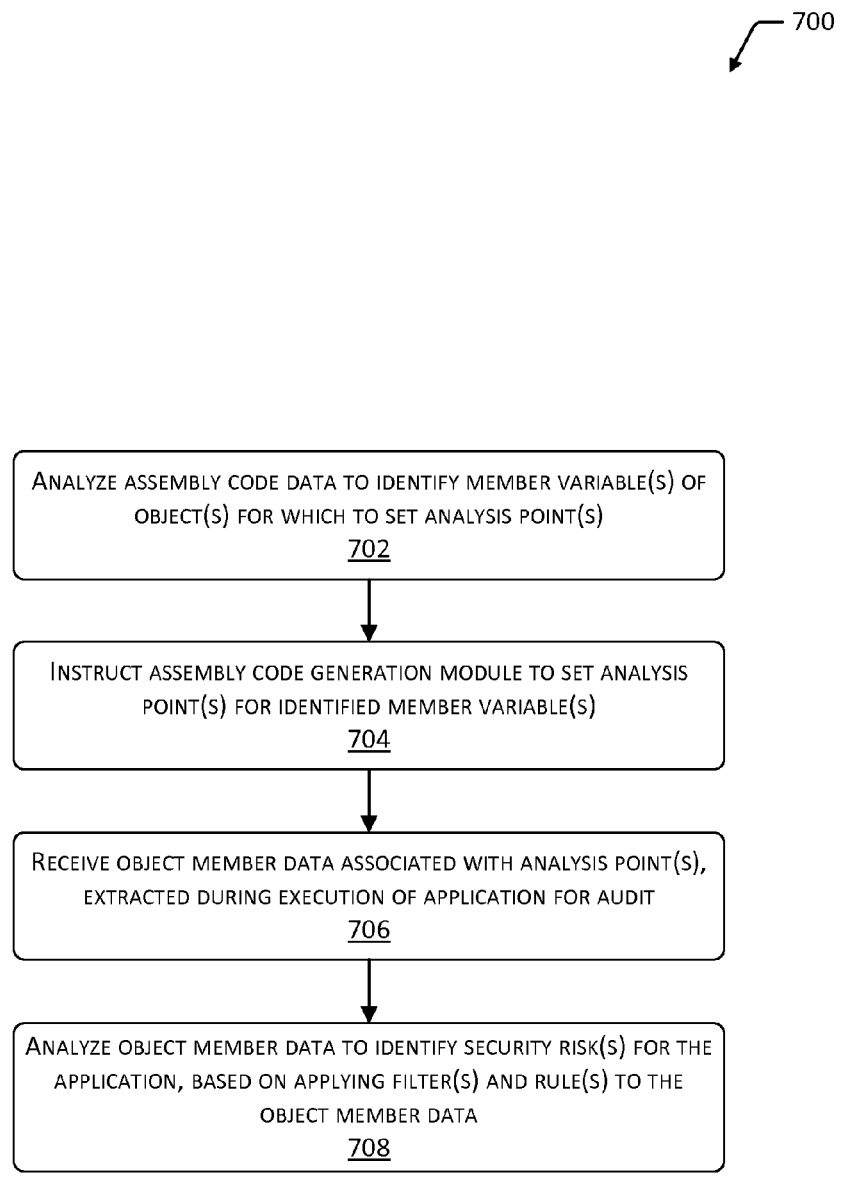
FIG. 7 depicts a flow diagram of a process for analyzing object data to identify security risks for an application.

FIG. 7 depicts a flow diagram 700 of a process for determining security risks for an application undergoing a security audit. This process may be implemented by the audit server(s) 108, the host device(s) 114, the client device(s) 104, or any combination thereof.

At 702, the assembly code data 118 may be analyzed to identify member variable(s) of object(s) for which to set analysis point(s). Member variables include variables defined within the source code of an object or class, or variables otherwise associated with an object or class such that methods of the object or class may access the variable's contents. Member variables may include static variables and instance variables. As used herein, an analysis point may refer to a location within a member method or function of a class or object of the application for audit 110, the location being at, after, or before a particular instruction in the method or function. An analysis point may be set to enable data to be retrieved from one or more member variables of the object or class at the location within a member method or function, to determine the value of the member variable(s) when the application for audit 110 is in a particular program state. In some embodiments, the data is retrieved by the assembly code generation module 116.

In some embodiments, analysis points are set at various locations in member methods of objects that perform actions for retrieving data from modules of the host device 114 or that perform actions for communicating the data from the host device 114 to another device or process. The analysis points may be associated with member variables of the objects, to enable the data stored in the member variables to be extracted. The extracted data may then be analyzed to determine whether the actions performed by the objects constitute a security risk of the application for audit 110.

At 704, the assembly code generation module 116 may be instructed to set the one or more analysis points for identified member variable(s), as determined at 702. In some embodiments, analysis points are set by sending instructions to the assembly code generation module 116 that the identified member variable(s) are to be monitored. For example, in embodiments where the assembly code generation module 116 is gdb, one or more watchpoints may be set to monitor the value of one or more member variables, using the watch, awatch, or rwatch commands in gdb.

At 706, member variable data associated with the analysis point(s) may be extracted by the assembly code generation module 116 and received for analysis. Such object member data may include data stored in member variable(s) of object(s) of the application for audit 110. Embodiments provide for the analysis of any type of member variable data, including numeric data (e.g., integer, floating point, double floating point, binary, hexadecimal, and so forth), character data, Boolean data, and other types.

At 708, the object member data is analyzed to identify security risks present in the application for audit 110. In some embodiments, such analysis is based on applying one or more filters and one or more rules to the object member data. This analysis is described further with reference to FIG. 9.

In some cases, the application for audit 110 may be an application that is executed within a web browser or a layout engine running on the host device 114. For example, the application for audit 110 may be written in one or more of the following: HTML, HTML5, cascading style sheets (CSS), javascript, or other markup or programming languages that are interpreted or executed by a browser application or a layout engine.

Figure 8:
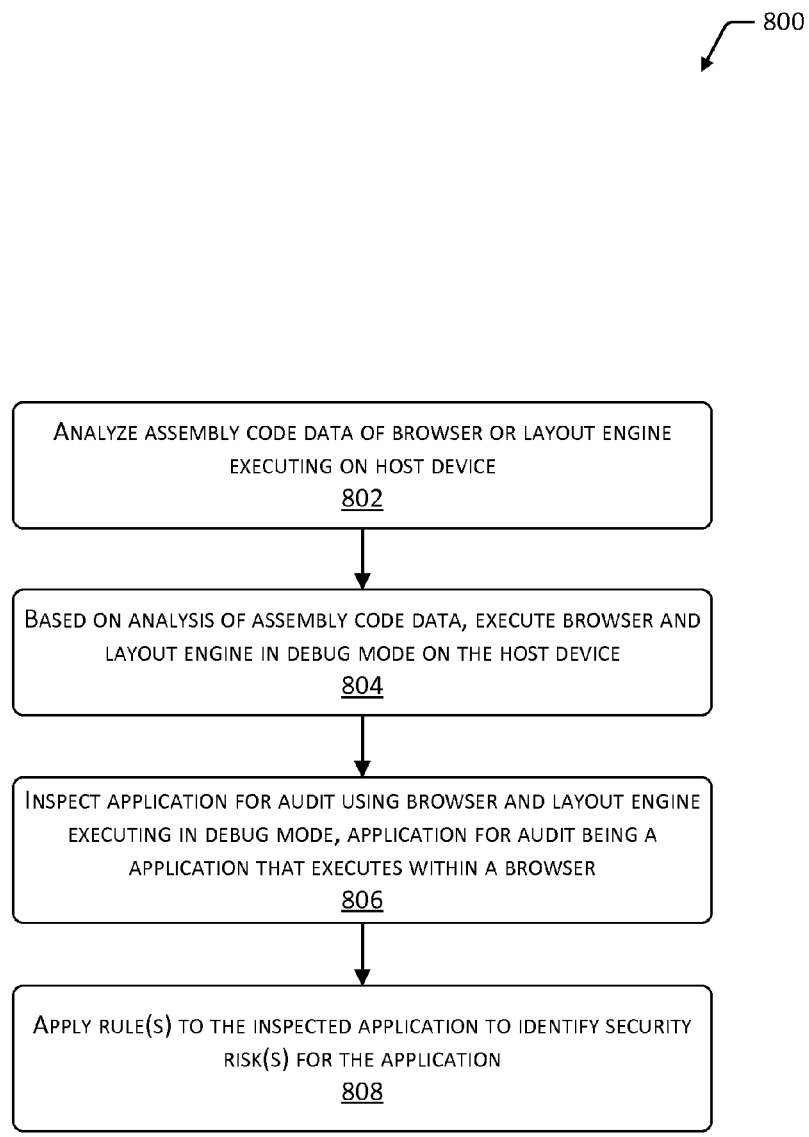
FIG. 8 depicts a flow diagram of a process for analyzing a browser-executed application to identify security risks, by inspecting the application using a browser or layout engine executing in debug mode.

FIG. 8 depicts a flow diagram 800 of a process for analyzing a browser-executed or layout engine-executed application to identify security risks, by inspecting the application using a browser or layout engine executing in debug mode. This process may be implemented by the audit server(s) 108, the host device(s) 114, the client device(s) 104, or any combination thereof.

In cases where the application for audit 110 is an application executed within a web browser or layout engine running on the host device 114, the assembly code data 118 may include assembly code generated by executing a web browser or a layout engine on the host device 114 and employing the assembly code generation module 116 to generate assembly code for the web browser or layout engine as described above. At 802, the assembly code data 118 of the browser or the layout engine is analyzed to determine how to execute the web browser or the layout engine in a debug mode.

Embodiments support the use of any web browser, including Mozilla® Firefox®, Microsoft® Internet Explorer®, Google® Chrome®, Apple® Safari®, Rockmelt®, and other browsers. A layout engine is a software module that enables a web browser to render a web page, and as such may operate in conjunction with a web browser to display web pages for a browser-executed application. Embodiments support the use of any layout engine, including WebKit, maintained through the WebKit Open Source Project, or other layout engines.

At 804, based on the analysis of the web browser and layout engine, the web browser and the layout engine are executed in a debug mode on the host device 114. Running a browser in debug mode may enable a user or script to view CSS elements, debug javascript code or other scripts and programs, monitor web connections and sessions, monitor GET, POST, PUT, or other requests, and perform other actions to inspect the browser-executed application. Some embodiments provide a runtime debug console, to enable debug information to be displayed during execution of an application in the web browser. Such debug information may include runtime errors associated with HTML, HTML5, CSS, javascript, or other code associated with the application.

At 806, the application for audit is inspected using the web browser and the layout engine executing in debug mode. Such inspection may include inspection of HTML, javascript, or CSS of the application, viewing page source for the application, viewing the document object model (DOM) of the application, viewing the UI WebView hierarchy of the application, debugging scripts, profiling the performance of the application, and other actions.

At 808, one or more rules may be applied to the inspected application to identify any security risks present in the application. For example, inspection of the HTML, javascript, CSS, or other code of the application may show that the application has gained access to a secret key or other cryptographic information for a website, and used that secret key to access otherwise secure features of the website. Such features may include features provided by a website through an API that is secured using the secret key. The application may then use that access to violate security of the website and access to secure information, cheat in a game, alter user privileges, or perform other actions. Embodiments may apply one or more rules to identify such actions as security risks. Rules that may be applied are described further with reference to FIGS. 9 and 10.

In some cases, inspection of the application may also include using a static analysis tool to check if javascript source code or other source code complies with syntax or grammar rules for its corresponding programming or scripting language. For such analysis, some embodiments may employ the JSLint tool created by Douglas Crockford.

Figure 9:
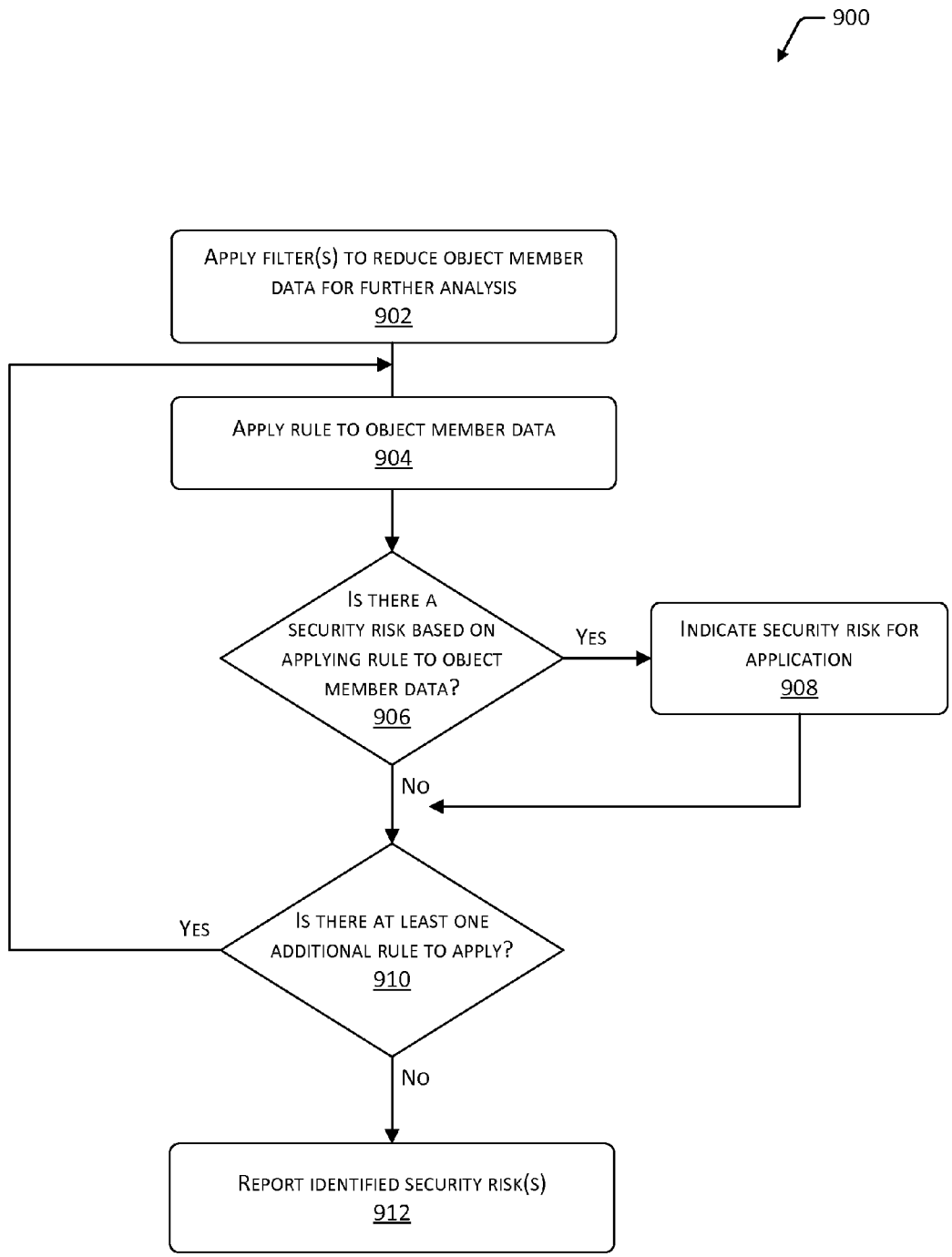
FIG. 9 depicts a flow diagram of a process for applying filter(s) and rule(s) to object data to identify security risks for an application.

FIG. 9 depicts a flow diagram 900 of a process for applying filter(s) and rule(s) to object member data, to identify security risks for an application for audit 110. This process may be implemented by the audit server(s) 108, the host device(s) 114, the client device(s) 104, or any combination thereof.

At 902, one or more filters are applied to the object member data. In some embodiments, filters may be applied to reduce the amount of object member data prior to further analysis of the object member data. Filters may be applied to select a certain subset of the object member data for further analysis, or to remove a certain subset of the object member data that is not relevant for determining security risks. For example, in some cases object member data may be filtered to remove data related to UI view variables which may not be relevant for determining security risks.

After the object member data has been filtered, one or more rules such as the rules for identifying security risks 126 may be applied to the object member data to identify security risks. These rules designate behaviors which may be indicative of security risks. Example rules are described in further detail with reference to FIG. 10. At 904, a rule is applied to the object member data. At 906, a determination is made whether there is a security risk based on applying the rule to the object member data. If so, at 908 a security risk is indicated for the application. If no security risk is determined, the process proceeds to 910. At 910, a determination is made whether there are additional rules to apply. If so, the process may return to 904 and apply the next rule to the object member data. If not, at 912 any security risks which have been identified through application of the rules may be reported as described above.

In some embodiments, analysis points may be placed within member methods of one or more interclass communication objects 508 to generate object member data. In cases where the application for audit 110 is written in the Objective-C programming language, and the interclass communication objects 508 include classes to implement the Objective-C interclass protocol, analysis points may be set in the objc_msgSend( ) function which provides a message passing interface between classes. The assembly code generation module 116 may be employed to eavesdrop on the objc_msgSend( ) function, as shown in Execution Sample 1 below generated as output from gdb monitoring calls to objc_msgSend( ) associated with debugging of the core timer function_NSCFTimer.

Execution Sample 1

0 0x37948f72 in objc_msgSend ( )
1 0x350cb5b2 in _NSFireTimer ( )
2 0x3557ba32 in
_CFRUNLOOP_IS_CALLING_OUT_TO_A_TIMER_CALLBACK_FUNCTION_
( )
3 0x3557b698 in _CFRunLoopDoTimer ( )
4 0x3557a26e in _CFRunLoopRun ( )
5 0x354fd4a4 in CFRunLoopRunSpecific ( )
6 0x354fd36c in CFRunLoopRunInMode ( )
7 0x37199438 in GSEventRunModal ( )
8 0x33009cd4 in UIApplicationMain ( )
9 0x00005e1e in ?? ( )
10 0x000033d8 in ?? ( )
0x4dba10: 0x3f5c63e0<OBJC_CLASS_$_NSCFTimer>
0x37133b7c: 0x61746572

Execution Sample 2 provides another example, in which gdb is employed to monitor calls to objc_msgSend( ) associated with debugging the NSURL function, used to make HTTP connections.

Execution Sample 2

Breakpoint 1, 0x37948f72 in objc_msgSend ( )
0 0x37948f72 in objc_msgSend ( )
1 0x35044608 in -[NSURLConnectionInternal
_withConnectionAndDelegate:onlyActive:] ( )
2 0x350ecdfa in -[NSURLConnectionInternal
_withErrorForConnection:] ( )

As used herein, objects may refer to program objects within an application. For example, in cases where the application for audit is written in the Objective-C programming language, the Java® programming language, or another object-oriented programming language, the objects may correspond to classes defined in the application source code, objects that are instantiations of classes at runtime, or both. Embodiments support the generation and use of assembly code data to validation applications written, entirely or in part, in an object-oriented programming language such as Java®, C++, C#, Python, Smalltalk, Objective-C, or other languages. Embodiments may also support validation of applications written in languages that include objects or similar constructs as features of the language, but with a grammar or syntax that varies from those of other object-oriented programming languages. For example, embodiments may provide for the validation of applications written in multi-paradigm programming languages that combine aspects of two or more of procedural, functional, and object-oriented paradigms, such as Lisp or Common Lisp. As used herein, an object may refer to a construct within a computer program, where the construct includes a combination of dynamic data elements, static data elements, methods, procedures, functions, or other elements.

Although some of the examples provided herein describe using an object level hierarchy to audit an application written in a particular programming language, embodiments may also operate to validate an application written in the Objective-C, Objective-C++, or Objective-C 2.0, the Java® programming language, or another programming language. For example, embodiments may support auditing of Objective-C applications written using the Cocoa application programming interface (API) from Apple Corp. of Cupertino, Calif. In such cases, embodiments may extract from the assembly code data 118 information for one or more objects included in or accessed during execution of the Objective-C application. In some embodiments, data from one or more Nib files associated with the application may be employed to identify objects associated with the application, and relationships between the objects. Such a Nib file may be loaded automatically when the application is launched on the host device 114, and may include data identifying user interface objects and relationships between the objects.

In some embodiments, the operations described herein may be performed via remote control operations. For example, the audit server 108 may remotely control the host device 114 to install and execute the application for audit 110, execute the assembly code generation module 116, set analysis points, retrieve member variable data for analysis, and so forth. Such remote control operations may be performed using methods or systems described in U.S. Patent application Ser. No. 13/619,867, filed on Sep. 14, 2012, titled "Remote Control of a Mobile Device," which is incorporated by reference above.

FIG. 10 depicts an example rule set 1000 including rules for identifying security risk(s) 126. In some embodiments, the rules for identifying security risks 126 (or "rules") may be in the form of a conditional "if condition X, then there is a security risk." The rule may have a single condition, such as the application accesses a system-specific portion of the file system. The rule may also be a compound condition, described as a Boolean combination of conditions. For example, the condition may be that the application accesses and retrieves data from a system-specific portion of the file system and communicates the retrieved data to a device that is external to the host device.

In the example shown, the rules 126 are divided into sets of rule types. Rules for communications 1002 include various rules to identify a security risk based on the types of communications performed by object(s) of the application for audit 110, the destinations of such communications, or the contents of such communications. Such communications may be performed using a communications protocol including but not limited to transmission control protocol (TCP), internet protocol (IP), hypertext transfer protocol (HTTP), hypertext transfer protocol secure (HTTPS), or file transfer protocol (FTP). In some embodiments, rules for communication 1002 may be applied to object member data retrieved through setting analysis points in methods associated with network communications, such as a method named "httpMethod" that is a member of a class of type "NSHTTPURLResponse." Rules may be applied to member variable data that includes payload data for an outgoing or incoming communication, or address information for a destination for the communications. Example rules for communications 1002 may include the following.

In some embodiments, a security risk may be identified based on whether the object communicates with an external entity, and whether that an identifier for the entity is part of an access control list. An access control list may include one or both of a white list and a black list, and a security risk may be identified if the object communicates with an external entity that is on a black list, or with an external entity that is not on a white list. The external entity may be a device, process, or individual that is external to the host device. The white list may be a list of entities that are known to be trusted, and the black list may be a list of entities that are known to be not trusted. In some cases, the white list may include devices on a corporate network, such that any communications outside the corporate network indicate a security risk. The white list may list addresses or other identifiers of devices, such as a uniform resource locator (URL), uniform resource identifier (URI), uniform resource name (URN), IP address, or other identifier. Under such rules the communication itself may be identified as a security risk, regardless of the particular data being communicated. A security risk may be determined based on a destination address, port, domain, or region of IP address space for the communication.

A security risk may be identified if the object communicates particular data or types of data with an external entity. For example, a rule may indicate a security risk if data from certain modules on the host device 114 is communicated externally, such as data from the phone book or address book. An analysis of the communicated data may be performed to determine whether it is of a sensitive nature, such as private data, personal data, financial data, healthcare-related data, or otherwise sensitive. The determination may be made based on one or more of request or response headers, data sent in GET or POST requests to a web site (e.g., for HTTP or HTTPS traffic), the address or port for the destination, the size of the content sent, or the data itself being sent.

A security risk may be identified if the object communicates with another application or process executing on the host device 114. In such cases, an object of the application for audit 110 may communicate with another application that is determined to communicate with external entities, such that data leakage may occur from the object through the other application to an external entity.

The rules 126 may also include rules for data access 1004, to identify a security risk based on access by the application for audit 110 to data stored on the host device 114 or on another device accessible from the host device 114. In some embodiments, rules for data access 1004 may be applied to object member data retrieved through setting analysis points in methods associated with accessing data on the host device 114, such as methods in an instance of a class "MMAddressBookMediator" or other object indicating that the application is accessing the address book on the host device 114.

Example rules for data access 1004 may include the following: A security risk may be identified if an object accesses data from particular module(s) on the host device 114, such as an address book, a phone book, a location system storing GPS data, portions of the file system used by system processes on the host device 114, an image store, or a camera module. In some cases, the access to such module(s) may itself be deemed a security risk, regardless of which data is being retrieved from the module(s). For example, any access to certain portions of the file system on the host device 114 may be deemed a security risk.

A security risk may be identified based on the application making one or more calls to a GPS or location system to determine a location for the host device 114. For example, an application running on iOS® may call to [CLLocationManager startUpdatingLocation] to determine a current location for the host device 114, and a security risk may be identified based on the call.

A security risk may be identified based on access to data on another device accessible to the host device 114. For example, in some cases the host device 114 may have access to a file server, email server, or other device accessible over a corporate network. In cases where the application for audit 110 is intended for personal use on the host device 114 and not for business-related use, a security risk may be identified if an object in the application for audit 110 attempts to access data from another device accessible to the host device 114 over the corporate network.

In some cases, a security risk may be identified if an object accesses particular type(s) of data from module(s) on the host device, or from module(s) on another device that is accessible to the host device 114. For example, access to identification or address data for contacts on the host device 114 may be deemed a security risk regardless of which module such data is being accessed from. In some cases, the rule may indicate a security risk based on a set of expected operations of the application for audit 110. For example, it may be inappropriate for a music player application to be accessing the address book or location information on the host device 114.

A security risk may be identified based on the type of object performing the data access operations. For example, data access operations by third party objects (e.g., objects from SDK libraries) to certain module(s) on the host device, or to other devices accessible to the host device, may be identified as a security risk.

In some embodiments, a security risk may be identified if the application for audit 110 accesses any file on the host device 114, or accesses any of a predetermined type of file or subset of files on the host device 114. In some embodiments, a user 106 may be informed of this access and queried to give permission whether the application for audit 110 is to be permitted to access the file(s). In some embodiments, the user 106 may be informed of the access and queried for permission through the audit user interface module 214.

The rules 126 may also include rules for data transfer 1006, to identify a security risk based on data transferred between objects of the application for audit 110. In some embodiments, rules for data transfer 1006 may be applied to object member data retrieved through setting analysis points in methods of interclass communication objects 508.

Example rules for data transfer 1006 may include the following: A security risk may be identified if an object accesses data from module(s) on the host device, and transfers at least a portion of that data to object(s) that communicate the data to external entities. A security risk may be identified if an object accesses data from module(s) on the host device and transfers at least a portion of that data to another application or process executing on the host device 114. A security risk may be identified if an object transfers data from a particular module on the host device 114 to a third party object included in the application for audit 110.

The rules employed by embodiments are not limited to the examples listed above. Any type of rule may be employed by embodiments. Further, the example rules above or other rules may be used in any combination to identify security risks of the application for audit 110. In some embodiments, the rules are static and may be maintained and updated manually by an operator of the audit server 108. However, embodiments are not so limited and in some cases, the rules may be dynamically adjusted or refined based on security risks detected through operations of the audit module 112 described herein. In some embodiments, the rules may be created or updated through a machine learning process. Such machine learning may be supervised or unsupervised, and may employ as training data information gathered regarding applications and the security risks identified for the applications.

Figure 11:
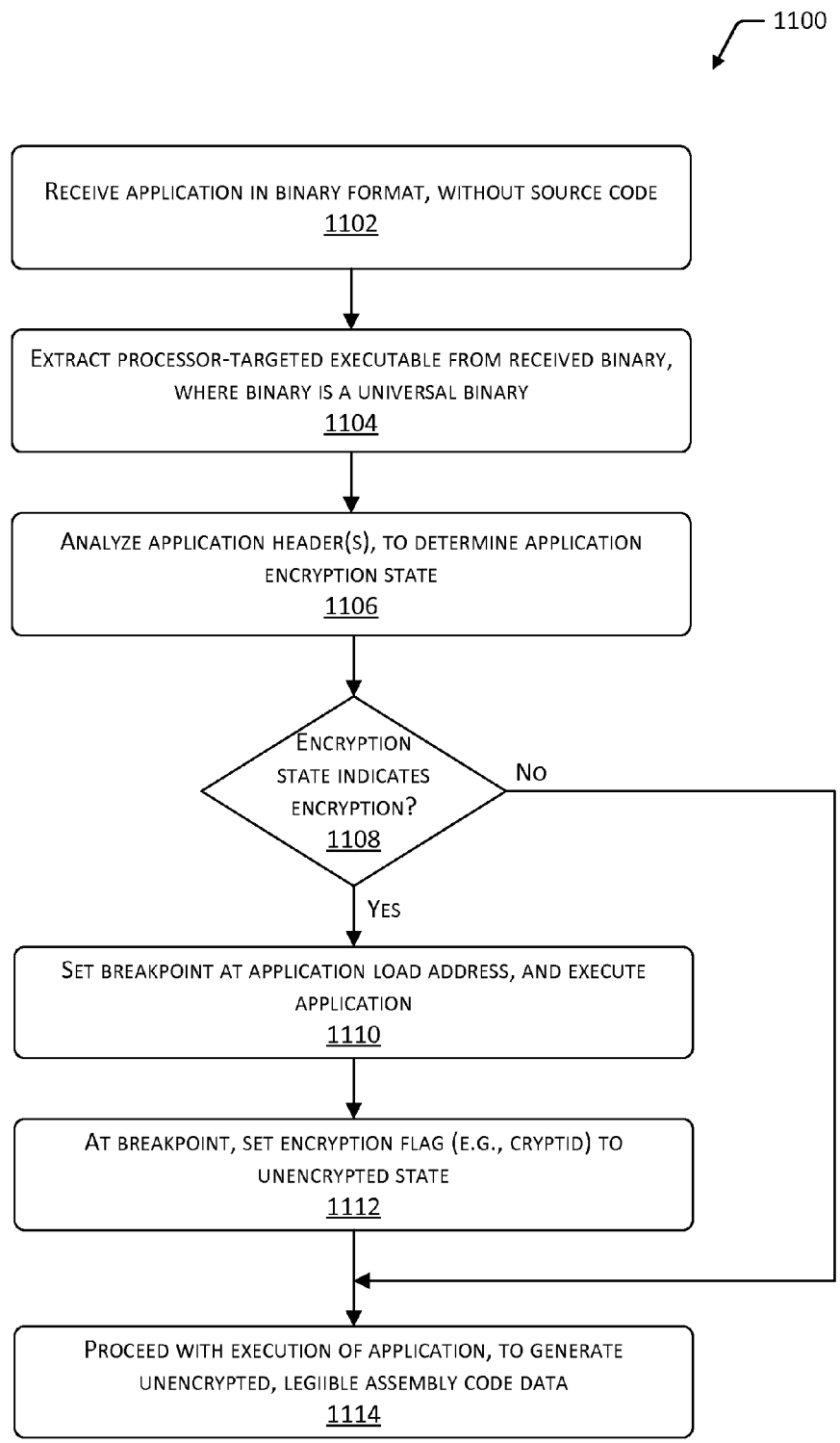
FIG. 11 depicts a flow diagram of a process for preparing an application binary to extract assembly code data associated with the application.

FIG. 11 depicts a flow diagram 1100 of a process for preparing an application to undergo a security audit. This process may be implemented by the audit server(s) 108, the host device(s) 114, the client device(s) 104, or any combination thereof. In some embodiments, operations of the process may be performed by the audit server(s) 108 after receiving the application(s) for audit 110 and prior to uploading the application(s) for audit 110 to the host device(s) 114.

At 1102, an application is received in a binary or executable format. In some cases, the application may be received from a client device 104 associated with a user 106 who is requesting that a security audit be performed on the application prior to releasing the application commercially or prior to use of the application on a corporate network. In some cases, the application may be received as a binary file and may not include the original source code for the application.

At 1104, in cases where the received binary is a universal or fat binary that includes executables for more than one target processor architecture, the executable may be extracted that is appropriate for the processor architecture of the host device 114 on which the application is to be executed. For example, a binary may be received that includes two executables, one to run on an ARM v6 processor and another to run on an ARM v7 processor, such as designed at least in part by ARM Holdings of Cambridge, England. This determination may be made through use of a tool that examines the universal binary, such as the "otool" utility which analyzes Mach-0 format files. Example Sample 3 shows an example execution of otool against an application "abc123," with output indicating two target architectures.

Execution Sample 3 root# otool -f /var/mobile/Applications/abc123
Fat headers
fat_magic Oxcafebabe
nfat_arch 2
architecture 0
   cputype 12
   cpusubtype 6
   capabilities 0x0
   offset 4096
   size 4890192
   align 2^12 (4096)
architecture 1
   cputype 12
   cpusubtype 9
   capabilities 0x0
   offset 4894720
   size 4303072
   align 2^12 (4096)

In cases where the binary is a universal binary which includes more than one executable, a utility may be used to extract one executable. For example, the "lipo" utility for Mach-0 formatted universal binaries may be used to perform the particular extraction. Execution Sample 4 shows an example execution of lipo to extract an ARM v7 executable from the example binary "abc123" shown in Execution Sample 3, and the use of otool to view the header information for the extracted executable.

Execution Sample 4 lipo -thin armv7 ~/abc123 -output ~/abc123.armv7
otool -h ~/abc123.armv6
/Users/appurifymac2/walmart.armv6:
Mach header

| magic | cputype | cpusubtype | caps ... |
|---|---|---|---|
| 0xfeedface | 12 | 6 | 0x00 |
| filetype | ncmds | sizeofcmds | flags |
| 2 | 43 | 4844 | 0x00018085 |

At 1106, application header information may be analyzed to determine an encryption state for the application. Some operating systems, such as the iOS® operating system from Apple® may be configured to encrypt at least a portion of the application, application data, and so forth, during loading or execution. For example, the application may be encrypted by the iOS® application loader may encrypt the application using the Advanced Encryption Standard (AES)_256-bit encryption algorithm, or some other encryption algorithm, when the application is loaded. In some cases, the information indicating that encryption is to be used for an application is located at a particular location that is an offset from the load address for the application. In such cases, once the load address for the application in virtual memory is determined, the encryption information may be found at an address that is at the offset from the load address.

In some embodiments, this analysis may be performed using a utility such as otool to examine header information and to identify a flag, variable, or other data item that indicates the encryption state for the application. Execution Sample 5 shows an example execution of otool for such a purpose, with a "grep" command to perform a text search for the encryption data in the header. In the following example, "cryptid" variable is set to 1 indicating an encrypted state for the application.

Execution Sample 5

```
otool -1 ~/abc123.armv6 |grep LC_ENCRYP -B1 -A4
Load command 11
    cmd LC_ENCRYPTION_INFO
    cmdsize 20
    cryptoff 8192
    cryptsize 4091904
    cryptid 1
```

At 1108, a determination is made whether the application is encrypted. If so, at 1110 a breakpoint is set at the start address for the encryption, and the application is executed with the assembly code generation module 116.

At 1112, the breakpoint is reached and the application pauses. While the application is paused, the encryption flag (e.g., cryptid) may be set to turn off encryption (e.g., set to 0). Turning off encryption enables unencrypted, legible assembly code data to be generated for the application. Generation of legible assembly code may be accomplished by dumping the memory from the start address up to "cryptsize" as shown in Execution Sample 3. If encryption is not turned off, the assembly code may show class names, method names, variables, and parameters in an encrypted form.

At 1114 the execution of the application resumes. Returning to 1108, when the application is determined to be unencrypted, the process proceeds to 1114.

Embodiments provide for turning off encryption in an application to facilitate the security auditing operations described herein. Turning off the encryption enables such investigation and testing for security flaws or vulnerabilities in the applications being audited.

Figure 12:
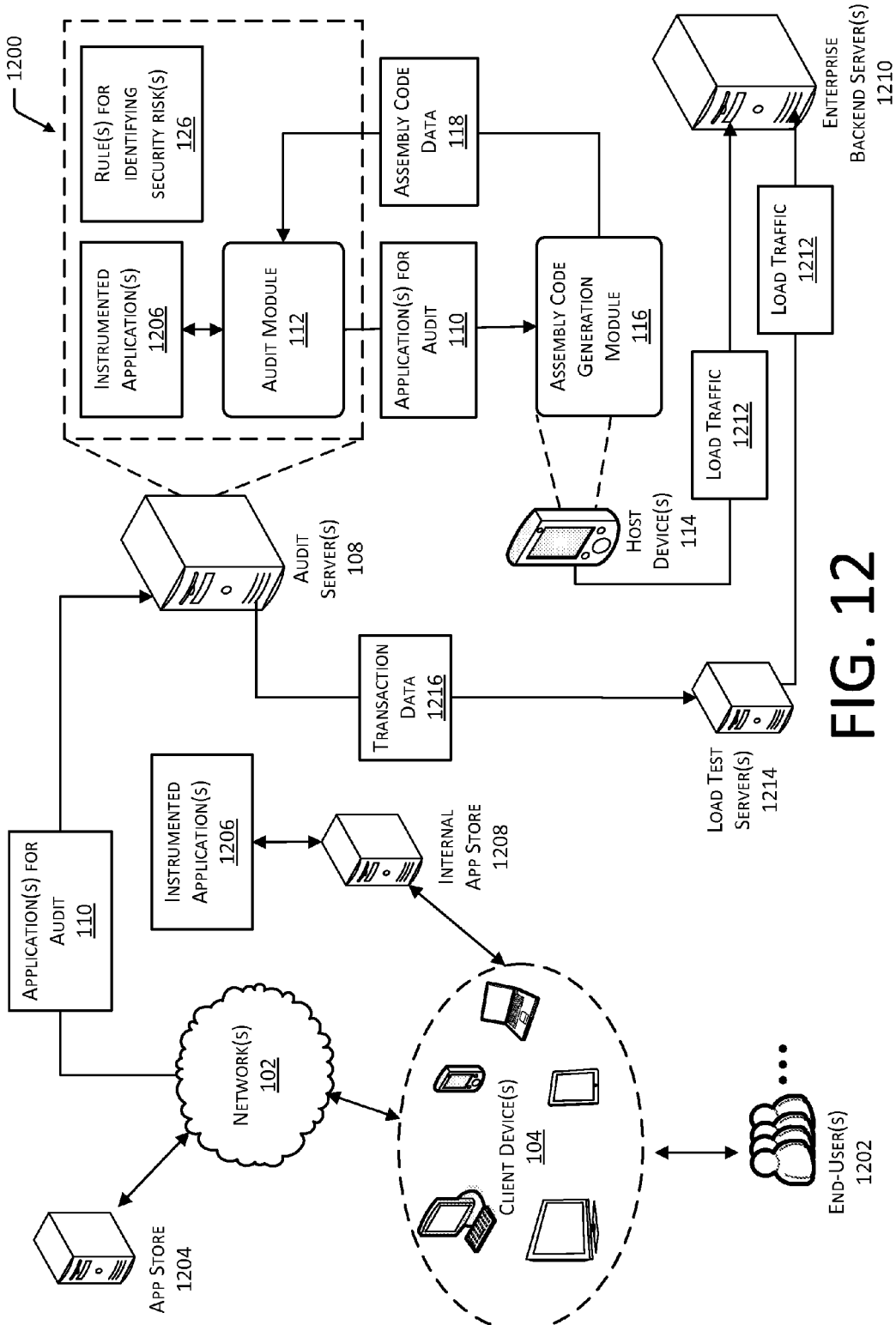
FIG. 12 depicts an environment for application security auditing through object level code inspection, and for load testing of services on backend server(s).

FIG. 12 shows an example environment 1200 in which various embodiments of application security auditing may operate. The environment 1200 includes various elements in addition to those described with regard to environment 100 of FIG. 1. In some embodiments, the client device(s) 104 are associated with end-user(s) 1202 who may be employees of a company, members of an organization, or otherwise may be operating client device(s) 104 to access resources over a corporate or organizational network. The end-user's 1202 may download applications from an app store 1204 which is publicly available and provides applications for free or for a charge. Prior to their use on a client device 104 connected to the corporate or organization network, such applications may undergo a security audit to ensure that their operation does not compromise corporate/organizational security. These applications may be provided, as application(s) for audit 110, to the audit server(s) 108 to undergo a security audit as described herein. The result of the security audit may be used to determine whether end-users 1202 are allowed to execute the application(s) for audit 110 on a client device 104 connected to the corporate or organizational network and resources.

In some embodiments, the audit module 112 or another module of the audit server(s) 108 may instrument or otherwise modify the applications prior to their use on or in conjunction with the corporate or organizational network. The instrumented application(s) 1206 may be made available to end-users 1202 such as through the app store 1204 or through an internal app store 1208. The internal app store 1208 may be accessible by employees or members such as end-users 1202, and may not be accessible by the general public. Such instrumenting or modification of applications for internal or limited use is described further herein with reference to FIG. 13.

In some embodiments, the host device(s) 114 or audit server(s) 108 may be employed to generate load traffic 1212 to be used for load testing, validation testing, or other testing of online services hosted by one or more enterprise backend servers 1210. Moreover, in some embodiments load test server(s) 1214 may be employed to generate the load traffic 1212. The load traffic 1212 may be generated by playing back transaction data 1216. The transaction data 1216 may be obtained by monitoring the interaction of the host device 114 with the enterprise backend server 1210 using the techniques described above. For example, the object data may be extracted during the interaction. The transaction data 1216 may be used by the load test server 1214, the host device 114, or both to replay at least a portion of the interaction for testing purposes. Such load testing is described further herein with reference to FIG. 14.

Figure 13:
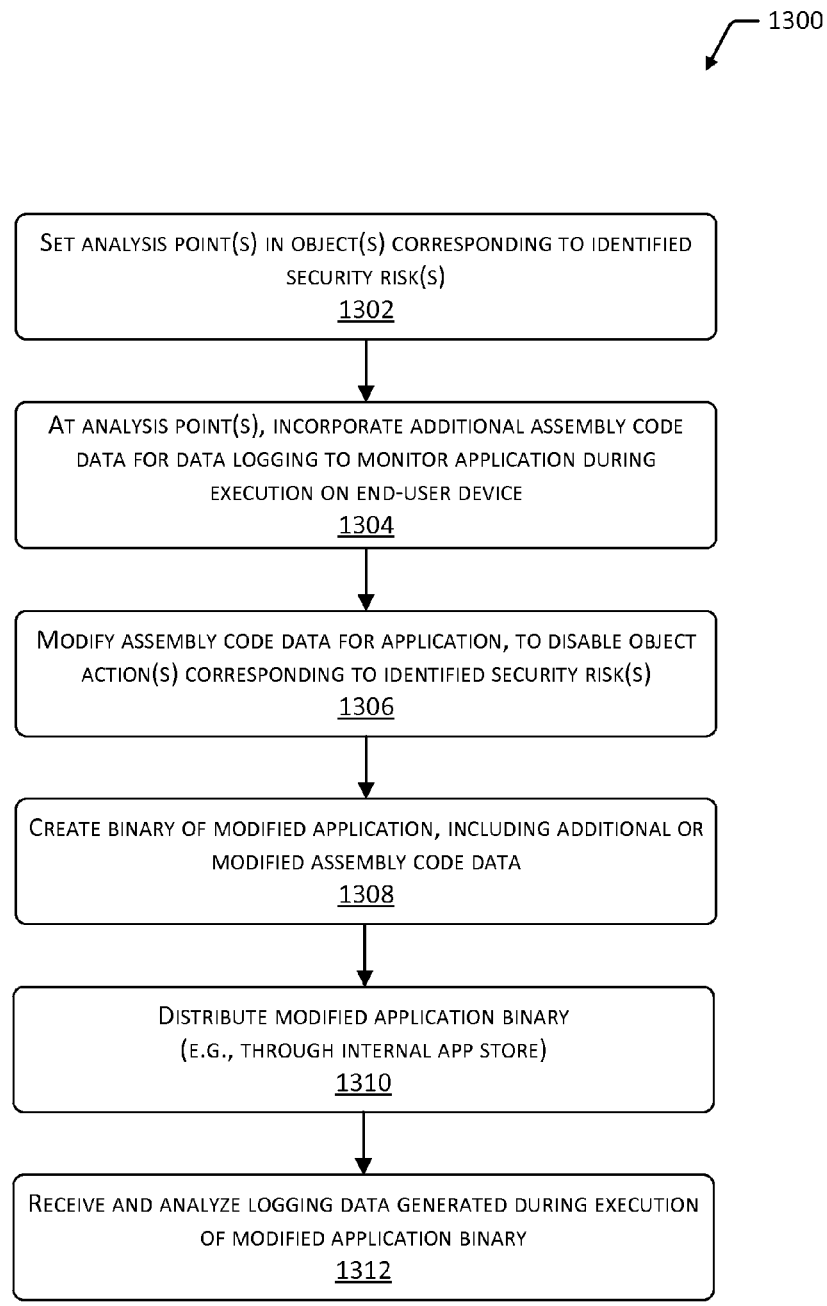
FIG. 13 depicts a flow diagram of a process for instrumenting an application for monitoring during execution, based on object data for the application.

FIG. 13 depicts a flow diagram 1300 of a process for instrumenting or modifying an application based on the object level security audit described above. The process may be implemented by the host device 114, the audit server 108, the client device 104, or a combination thereof.

At 1302, one or more analysis points are set in object(s) corresponding to identified security risks of the application, as described above. For example, an analysis point may be set in a member method of an object that communicates with an external website, to enable monitoring of one or more member variables that store data for the destination address or port of the communications, one or more member variables that store the payload data being communicated, or other member variables.

At 1304, additional assembly code data may be injected or otherwise incorporated into the assembly code data for the application. In some embodiments, the additional assembly code data includes functionality for data logging. The data logging is configured to write the contents of member variables out to data logs in storage when the application executes on a client device 104. The additional assembly code data may also include instructions to capture information for the application state when the data is logged, including a stack trace for the application, contents of variables, classes, objects, or instances of objects, or other data useful for monitoring the operation of the application. For example, where the application is accessing data from its host device and communicating that data externally, the additional assembly code may write to memory the data being accessed and communicated, and the destination URL, IP address, port, and so forth where the data is being sent. In this way, embodiments may enable the application to be monitored for security breaches while it is executing on a device which connects to a corporate or organizational network.

At 1306, one or more additional modifications may be made to the assembly code for the application. These modifications may disable one or more functions of the application that are determined to be associated with a security risk. For example, where the application would otherwise be able to access an address book on a device, its assembly code may be modified to block such access, or prevent the accessed data from being communicated externally or transferred to other objects of the application.

At 1308, a binary version of the application may be created by compiling the original (e.g., unmodified) assembly code for the application with the additional assembly code added at 1304 and the modified assembly code modified at 1306. At 1310, this binary version of the application is provided for use by one or more end-users 1202. In some embodiments, the modified version of the application is provided to an end-user's device through an internal app store 1208 that is accessible to company employees, organizational members, or some other subset of the general user population.

After the end-users 1202 download, install, and execute the modified version of the application on their client devices 104, at 1312 the log data generated during execution of the instrumented application is received from the client devices 104 and analyzed to determine whether any additional security risks have manifested. In some embodiments, the log data may be periodically uploaded (e.g., daily) to the audit server 108 or to another device for analysis. In some embodiments, the log data may be retrieved when the client device 104 connects to the corporate or organizational network. In some embodiments, the log data is retrieved under particular network conditions, such as when the client device 104 connects to the corporate network via a WiFi connection instead of a cellular data connection (e.g., a 3G connection).

In some embodiments, where the application for audit 110 is written in Objective-C, data logging may be performed inserting assembly code including calls to the NSLog( ) function. Execution Sample 6 shows an example data log generated through monitoring of calls to NSURLConnectionInternalConnection.

Execution Sample 6

Oct 7 11:38:04 testa-iPhone testb-iPhone[2636]:
-[NSURLConnectionDelegate
didReceiveResponse:http://testabc.com/123/dam/assets/
    1210
099991215-weather-story-top.jpg]
{
    "Cache-Control"="max-age=7200";
    "Content-Length"=76716;
    "Content-Type"="image/jpeg";
    Date="Sun, 7 Oct. 2012 18:38:03 GMT";
    Expires="Sun, 7 Oct. 2012 19:48:32 GMT";
    Server="Apache-Coyote/1.1";
}
Oct 7 11:38:04 testa-iPhone testb-iPhone[2636]:
-[NSURLConnectionDelegate
didReceiveResponse:http://testabc.com/123/dam/assets/
    1210
0504932527-03-weather-trail-1005-small-video.jpg]
{
    "Cache-Control"="max-age=7200";
    "Content-Length"=19960;
    "Content-Type"="image/jpeg";
    Date="Sun, 7 Oct. 2012 18:38:03 GMT";
    Expires="Sun, 7 Oct. 2012 20:25:21 GMT";
    Server="Apache-Coyote/1.1";
}

Oct 7 11:38:04 testa-iPhone testb-iPhone[2636]:
-[NSURLConnectionDelegate
didReceiveResponse:http://testabc/2012/images/01/13/
    jan13.mueller.jpg]
{
    "Accept-Ranges"=bytes;
    "Cache-Control"="max-age=3600";
    "Content-Length"=191473;
    "Content-Type"="image/jpeg";
    Date="Sun, 7 Oct. 2012 18:38:03 GMT";
    Expires="Sun, 7 Oct. 2012 19:27:48 GMT";
    "Last-Modified"="Fri, 13 Jan. 2012 20:14:46 GMT";
    Server=Apache;
}
Oct 7 11:38:04 testa-iPhone testb-iPhone[2636]:
-[NSURLConnectionDelegate
didReceiveResponse:http://testabc.com//dam/assets/
    1123051
25433-open-invitation-00923925-small-video.jpg]
{
    "Cache-Control"="max-age=7200";
    "Content-Length"=21356;
    "Content-Type"="image/jpeg";
    Date="Sun, 7 Oct. 2012 18:38:03 GMT";
    Expires="Sun, 7 Oct. 2012 20:38:03 GMT";
    Server="Apache-Coyote/1.1";
}

Figure 14:
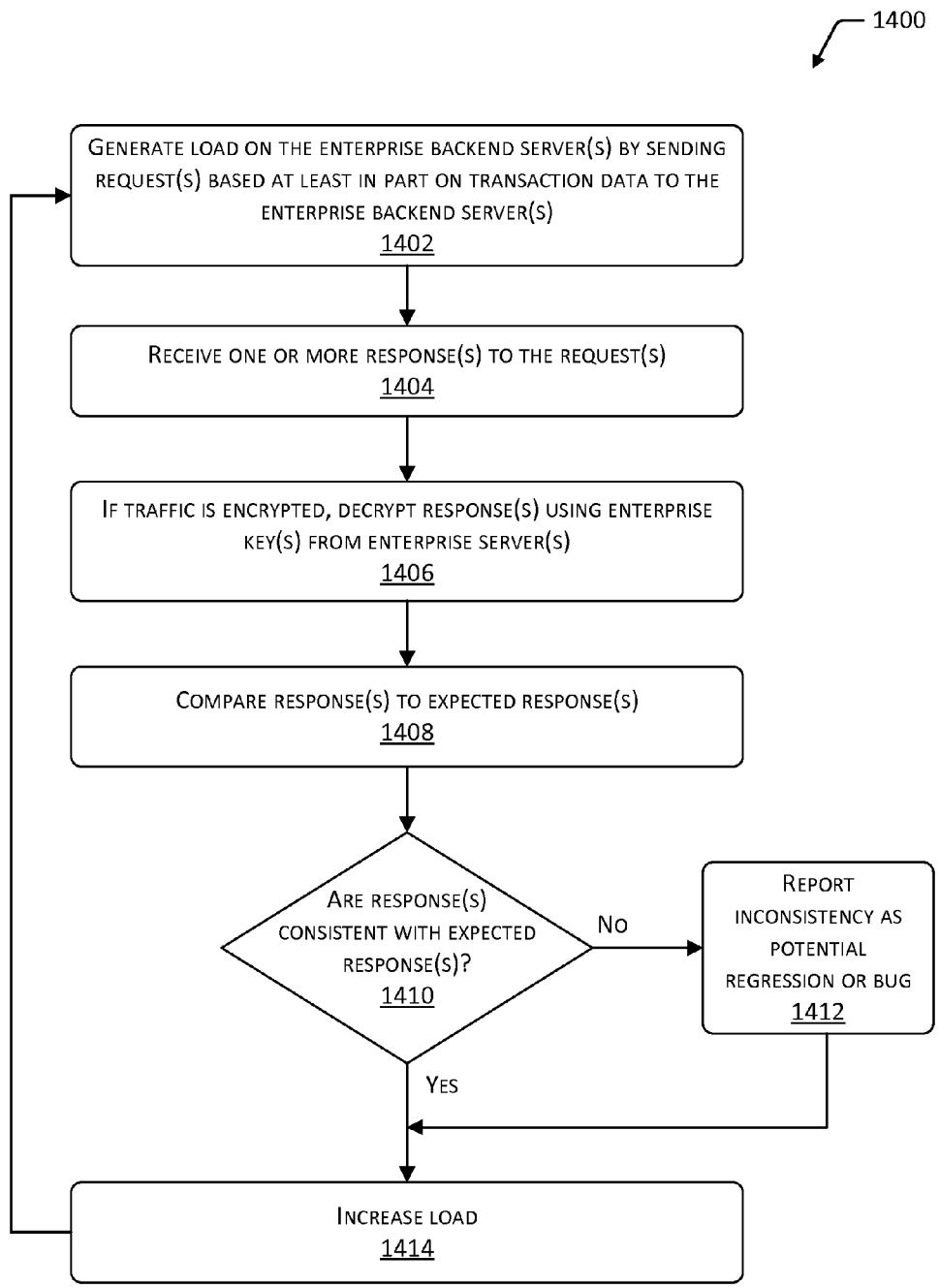
FIG. 14 depicts a flow diagram of a process for functional testing and load testing of services on backend server(s).

FIG. 14 depicts a flow diagram 1400 of a process for testing of web sites or other services hosted on a backend server, such as the enterprise backend server(s) 1210. The process may be implemented by the host device 114, the audit server 108, the client device 104, the enterprise backend server 1210, the load test server(s) 1214, or any combination thereof.

At 1402, load is generated on the enterprise backend server(s) 1210 by sending requests to the enterprise backend server(s) 1210. In some embodiments, load is generated by sending requests from the load test server(s) 1214. Load may also be generated by sending requests from the host device(s) 114, or the audit server(s) 108. In some embodiments, the requests are sent to the enterprise backend server(s) 1210 to access one or more features of the services hosted on the enterprise backend server(s) 1210 which are under test, thus placing a load on such services. The requests may be based at least in part on the transaction data 1216 as described above. For example, where the hosted services under test include a web site for online banking, the requests sent may replay interactions which establish, cancel, or maintain accounts, deposit, withdraw, or transfer funds, apply for a loan, order checks or money orders, or perform other activities relevant to online banking. In some cases, the requests may be sent with a particular timing or from a particular number of devices to generate a particular load on the enterprise backend server(s) 1210. This may enable the functionality of the hosted services to be tested with measured load or usage conditions.

At 1404, one or more responses may be received to the requests sent at 1402. If the traffic is encrypted, e.g., if the requests and responses were sent using HTTPS or another encrypted communications protocol, at 1406 the responses may be decrypted using one or more encryption keys associated with the enterprise backend server(s) 1210. For example, where the requests are sent using the Secure Sockets Layer (SSL) or Transport Layer Security (TLS) cryptographic protocols (e.g., as in the HTTPS protocol), the enterprise public key may be used to decrypt the response traffic.

At 1408, the responses are compared to expected responses, to determine whether the enterprise hosted services have functioned correctly under the applied traffic load.

In some embodiments, the comparison may be a comparison between the received responses and a baseline response previously generated by the hosted services under lesser load or minimal load. In some embodiments, the baseline for comparison may be provided by the enterprise expected behavior of the services as designed. In some embodiments, the comparison may compare baseline source code to the source code of at least a portion of a web page received in response to the requests sent. In some embodiments, the baseline may be determined based on the object level analysis of assembly code data for the application as described above.

At 1410, a determination is made whether the response(s) are consistent with the comparison baseline (e.g., the expected response(s)). If not, then at 1412 a report may be made of a possible regression, error, or bug detected during the load testing of the hosted services on the enterprise backend server(s) 1210. The process may then proceed to block 1414.

Returning to 1410, if the responses are consistent with the comparison baseline, the process may proceed to 1414. At 1414 the load may then be increased and the process repeated under a different load. In such cases, the responses received in the previous test may be used as a baseline during the subsequent iteration.

In many cases, web sites or other online services include certain features designed to be optimally used through a mobile device such as a smartphone, tablet computer, eBook reader, and the like. In some embodiments, where the host device(s) 114 include mobile devices, embodiments provide a means for generating a given load of mobile device traffic for load testing the mobile device-specific functionality of a web site. Such mobile device traffic may be generated under a variety of network connectivity scenarios, to test the web site under a variety of real-world conditions. For example, the host devices 114 may be controlled to operate over a variety of network connections, including a wireless network (e.g., WiFi), 3G or 4G cellular data network, or a wired connection, with varying connection strengths (e.g., varying number of bars as shown on the device).

Object data may be extracted during communications between the host device(s) 114 and the backend server(s) 1210 to generate the transaction data 1216. The object data may include communications payloads as well as data indicating the address, port, and other information identifying the source and destination of each communication. The transaction data 1216 comprising the extracted data may be replayed with a predetermined number of connections or at a predetermined frequency to create a predetermined load to be placed on the backend server 1210. By replaying the extracted data at the predetermined traffic load, the services running on the backend server(s) 1210 may be load tested using the mobile device traffic extracted during communications between mobile devices of the host device(s) 114 and the backend server(s) 1210.

In some cases, the transaction data 1216 indicative of the mobile device traffic may be played back from devices such as the load test server(s) 1214 that may not themselves be mobile devices. In some embodiments, playback of the transaction data 1216 may be through a web load testing tool such as HP Load Runner®, from Hewlett-Packard Company of Palo Alto, Calif., or the WireShark® packet analyzer and TShark® network protocol analyzer from the Wireshark open source project. In such cases, the extracted mobile communications data may be provided as input to the replay functionality of the web load testing tool. In some embodiments, the transaction data 1216 may be formatted in a file format used by HP Load Runner®, WireShark®, TShark®, or other tools. For example, the transaction data 1216 may be formatted in a packet capture (PCAP) file format, suitable for input to such tools.

Execution Samples 7 and 8 provide example execution outputs from a web load testing tool. Execution Sample 7 provides an example output of a web testing tool to measure the performance of a website "www.abc123.com," to create a benchmark for its performance. In this example, traffic generated from an iPhone 4S is replayed using 10 threads, with each thread issuing 10 HTTP requests in parallel. The traffic is over a 4G/WiFi connection with a request rate of 1.2 requests/second with a traffic load of 127 KB/second.

Execution Sample 7 iOS_http_benchmark --server=www.abc123.com --num-
conns=10 --num-calls=10 iOS_http_benchmark --client=0/1 -
-server=www.abc123.com --port=80 --uri=/
--send-buffer=4096 --recv-buffer=16384 --num-conns=
10 --
num-calls=10
Maximum connect burst length: 1
Total: connections 10 requests 92 replies 91 test-
duration 78.610 s
Connection rate: 0.1 conn/s (7861.0 ms/conn, <=1 concurrent connections) Connection time [ms]: min 6231.6
avg 7861.0 max 14392.6 median 6504.5 stddev 2601.0
Connection time [ms]: connect 816.5 Connection length [replies/conn]: 9.100
Request rate: 1.2 req/s (854.5 ms/req)
Request size [B]: 64.0
Reply rate [replies/s]: min 0.0 avg 1.1 max 1.6 stddev
0.6 (15 samples) Reply time [ms]: response 80.3 transfer
608.4 Reply size [B]: header 256.0 content 112004.0
footer 2.0 (total 112262.0) Reply status: 1xx=0 2xx=91
3xx=0 4xx=0 5xx=0
CPU time [s]: user 77.35 system 0.00 (user 98.4% system
0.0% total 98.4%) Net I/O: 127.0 KB/s (1.0*10^6 bps)
Errors: total 1 client-timo 0 socket-timo 0 connrefused 0
connreset 1
Errors: fd-unavail 0 addrunavail 0 ftab-full 0 other 0

Execution Sample 8 provides an example output of a web testing tool to measure the performance of the same website, but with different network conditions using a 4G connection with 4 bars, using traffic from the same device. Execution Sample 8 shows a degradation in reply rate from an average reply rate 1.1 to an average reply rate of 1.0.

Execution Sample 8 iOS_http_benchmark --server=www.abc123.com --num-
conns=10 --num-calls=10 iOS_http_benchmark --client=0/1 -
-server=www.abc123.com --port=80 --uri=/
--send-buffer=4096 --recv-buffer=16384 --num-conns=
10 --
num-calls=10
Maximum connect burst length: 1
Total: connections 10 requests 100 replies 100 test-
duration 95.266 s
Connection rate: 0.1 conn/s (9526.6 ms/conn, <=1
concurrent connections) Connection time [ms]: min
8351.2
avg 9526.6 max 11569.7 median 9230.5 stddev 1020.5

Connection time [ms]: connect 81.9 Connection length [replies/conn]: 10.000
Request rate: 1.0 req/s (952.7 ms/req)
Request size [B]: 64.0
Reply rate [replies/s]: min 0.8 avg 1.0 max 1.2 stddev 0.1 (19 samples) Reply time [ms]: response 182.2 transfer 762.3 Reply size [B]: header 226.0 content 112004.0 footer 2.0 (total 112232.0) Reply status: 1xx=0 2xx=100 3xx=0 4xx=0 5xx=0
CPU time [s]: user 94.91 system 0.00 (user 99.6% system 0.0% total 99.6%) Net I/O: 115.1 KB/s (0.9*10^6 bps)
Errors: total 0 client-timo 0 socket-timo 0 connrefused 0 connreset 0
Errors: fd-unavail 0 addrunavail 0 ftab-full 0 other 0

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in a computer-readable storage medium as instructions executable on one or more processors.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
    instructing a host device to execute an application;
    analyzing assembly code data generated during execution of the application on the host device to determine one or more objects associated with the application, wherein the one or more objects comprise object member data;
    filtering the object member data to obtain filtered member data by at least: removing a first subset of the object member data not associated with security risks, selecting a second subset of the object member data for security risk analysis, or both removing the first subset of the object member data and selecting the second subset of the object member data;
    identifying at least one data access operation performed by the application to access data on the host device, the identifying based at least partly on the filtered member data; and
    determining at least one security risk associated with the application, based at least partly on the at least one data access operation.

2. The method of claim 1, wherein the determining of the at least one security risk is further based on analyzing the data that is accessed in the at least one data access operation.

3. The method of claim 1, further comprising:
    based on the analyzing of the assembly code data, identifying at least one object of the one or more objects of the application, the at least one object including functionality to perform the at least one data access operation on the host device.

4. The method of claim 3, wherein the determining of the at least one security risk is further based on determining that the at least one object includes at least one object, class, method, variable, or element of third party software.

5. The method of claim 1, wherein the determining of the at least one security risk is based on determining that the accessed data is communicated in at least one communication to an external device.

6. The method of claim 5, wherein the determining of the at least one security risk is further based on determining that the external device is not trusted based on at least one of the following: a presence of an address of the external device on a black list, or an absence of the address of the external device from a white list.

7. The method of claim 1, further comprising:
    based on the analyzing of the assembly code data, identifying at least one object of the one or more objects of the application, the at least one object including functionality for performing at least one of the following: the at least one data access operation, or at least one communication to communicate the accessed data to an external device;
    incorporating additional assembly code data into the assembly code data for the application, the additional assembly code data providing additional functionality for logging data that is sent from or received to the at least one object; and
    providing a version of the application, including the additional assembly code data, to a client device.

8. A system comprising:
    a host device, including an assembly code generation module; and
    a server device in communication with the host device, the server device including at least one module stored in at least one memory of the server device and executed by at least one processor of the server device to:
        execute an application on the host device;
        execute the assembly code generation module on the host device to generate assembly code data associated with the executing application;
        analyze the assembly code data generated during execution of the application to determine one or more objects associated with the application, wherein the one or more objects comprise object member data;
        filter the object member data to obtain filtered member data by at least: removing a first subset of the object member data not associated with security risks, selecting a second subset of the object member data for security risk analysis, or both removing the first subset of the object member data and selecting the second subset of the object member data;
        identify at least one communication between the application and an external device based at least partly on the filtered member data;
        based at least partly on the at least one communication, determine at least one security risk that is associated with the application and that indicates a transfer of data from the host device to the external device;
        determine communications data for a transaction involving the host device, the communications data determined based on the filtered member data; and
        generate a plurality of communications to enable load testing of the at least one service, the plurality of communications including the communications data.

9. The system of claim 8, wherein the at least one module further operates to:
  determine data that is input to the one or more objects and that is communicated in the at least one communication; and
  analyze the data to determine the at least one security risk.

10. The system of claim 9, wherein the analyzing of the data to determine the at least one security risk includes determining that the data is at least one of sensitive data, personal data, financial data, or private data.

11. The system of claim 8, wherein the at least one module further operates to:
  based on the analyzing of the assembly code data, identify a first object of the one or more objects that includes functionality to perform the at least one communication;
  based on the analyzing of the assembly code data, identify a second object of the one or more objects that includes functionality to access data on the host device;
  based on the analyzing of the assembly code data, identify data that is transferred from the second object to the first object during the execution of the application; and
  based on the identifying of the data, determine the at least one security risk.

12. The system of claim 11, wherein the at least one module further operates to:
  based at least in part on the analyzing of the assembly code data, set at least one analysis point in the first object or the second object, the at least one analysis point associated with a member variable that stores the data transferred from the second object to the first object; and
  while the application is executing, extract the data that is transferred from the second object to the first object.

13. The system of claim 11, wherein the second object includes functionality to access the data from at least one of the following through the host device: phone book data, address book data, email data, location data, or file system data.

14. The system of claim 11, wherein the second object includes functionality to access the data from a cloud-based storage device that is accessible to the host device.

15. The system of claim 8, wherein the at least one module further operates to:
  based on the analyzing of the assembly code data, identify at least one object of the one or more objects that includes functionality to perform the at least one communication;
  set at least one analysis point associated with at least one member variable of the at least one object;
  while the application is executing, extract data that is stored in the at least one member variable of the at least one object; and
  apply one or more rules to the extracted data to determine the at least one security risk.

16. The system of claim 8, wherein the host device includes a mobile operating system.

17. A system, comprising:
  at least one memory;
  at least one processor configured to access the at least one memory; and
  at least one audit module stored in the at least one memory and executed by the at least one processor to:
    analyze assembly code data generated by an assembly code generation module during execution of an application on a host device to determine one or more objects associated with the application, wherein the one or more objects comprise object member data;
    filter the object member data to obtain filtered member data by at least: removing a first subset of the object member data not associated with security risks, selecting a second subset of the object member data for security risk analysis, or both removing the first subset of the object member data and selecting the second subset of the object member data;
    identify at least one communication between the application and an entity, based at least partly on the filtered member data; and
    determine at least one security risk associated with the application, based at least partly on the at least one communication.

18. The system of claim 17, wherein the entity includes an external device that is in communication with the host device over a network.

19. The system of claim 18, wherein the at least one security risk indicates a transfer of data from the host device to the external device by the application.

20. The system of claim 17, wherein the entity includes at least one other application executing on the host device.

21. The system of claim 17, wherein the at least one audit module further operates to:
  provide a report of the at least one security risk, including information regarding the at least one communication.

22. The system of claim 17, wherein the at least one audit module further operates to:
  based on the analyzing of the assembly code data, identify a first object of the one or more objects, the first object including functionality for performing the at least one communication;
  based on the analyzing of the assembly code data, identify a second object of the one or more objects, the second object including functionality for accessing data associated with another application on the host device;
  based on the analyzing of the assembly code data, identify the data that is transferred from the second object to the first object during the execution of the application; and
  analyze the transferred data to determine the at least one security risk.

23. The system of claim 17, wherein the at least one audit module further operates to:
  based on the analyzing of the assembly code data, identify at least one object of the one or more objects that includes functionality for at least one of the following: performing the at least one communication, or accessing data on the host device;
  incorporate, into the assembly code data for the application, additional assembly code data for writing data of the at least one object to storage on the host device, to enable monitoring of the at least one security risk; and
  provide a version of the application that includes the additional assembly code data to a client device.

24. The system of claim 17, wherein the at least one audit module further operates to:
  based on the analyzing of the assembly code data, identify at least one object of the one or more objects that includes functionality for at least one of the following: performing the at least one communication, accessing data on the host device, or accessing data stored on a cloud-based device that is accessible to the host device;
  modify the assembly code data for the application to disable at least one action of the at least one object to at least partly obviate the at least one security risk; and
  provide a version of the application that includes the modified assembly code data to a client device.

* * * * *